United States Patent
Kawai

(10) Patent No.: US 7,528,995 B2
(45) Date of Patent: May 5, 2009

(54) SYNCHRONIZATION SIGNAL GENERATOR AND IMAGE FORMING APPARATUS

(75) Inventor: Yoshiaki Kawai, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 1090 days.

(21) Appl. No.: 10/773,584

(22) Filed: Feb. 6, 2004

(65) Prior Publication Data

US 2005/0275713 A1 Dec. 15, 2005

(30) Foreign Application Priority Data

Feb. 6, 2003 (JP) ............................. 2003-030109

(51) Int. Cl.
*H04N 1/36* (2006.01)
*B41J 2/435* (2006.01)

(52) U.S. Cl. .................. 358/410; 358/409; 347/250

(58) Field of Classification Search ............... 358/409, 358/410, 411, 425, 426.02, 434, 1.1, 1.9, 358/1.15, 1.5, 1.18; 347/250, 235
See application file for complete search history.

(56) References Cited

U.S. PATENT DOCUMENTS

| | | | |
|---|---|---|---|
| 6,034,789 A | 3/2000 | Kawai | |
| 6,154,246 A | 11/2000 | Ogasawara et al. | |
| 6,292,269 B1 | 9/2001 | Kawai | |
| 6,310,681 B1 | 10/2001 | Taniwaki | |
| 6,498,617 B1 | 12/2002 | Ishida et al. | |
| 2002/0051137 A1* | 5/2002 | Ema et al. | 358/1.1 |
| 2003/0025785 A1* | 2/2003 | Nihei et al. | 347/250 |
| 2003/0067533 A1* | 4/2003 | Omori et al. | 347/248 |

FOREIGN PATENT DOCUMENTS

| | | |
|---|---|---|
| DE | 19843596 A1 | 4/1999 |
| JP | 09174917 | 7/1997 |
| JP | 2000221431 | 8/2000 |
| JP | 2002096502 | 4/2002 |

OTHER PUBLICATIONS

Nov. 14, 2005 official Communication and European Search Report in connection with European Application No. EP 04 25 0663 which corresponds to the above-identified application.

* cited by examiner

*Primary Examiner*—Madeleine A Nguyen
(74) *Attorney, Agent, or Firm*—Cooper & Dunham, LLP

(57) ABSTRACT

An image forming apparatus using a synchronization signal generator can easily generate a pixel clock that enables both a magnification correction in a main scanning direction and a correction of expansion and contraction of pixel width in the main scanning direction. Each of pixel clock generation units generates a clock signal by dividing a frequency of a high-frequency clock so as to generate pulses of a reference period, a long period longer than the reference period and a short period shorter than the reference period, and outputs, as the pixel clock, one of the pulses that is designated by an output selection signal. A pixel clock correction data synthesizing unit synthesizes a first selection signal, which is generated base on a time-series distribution of the pulses of each period defined by a first set of data, and a second selection signal, which is based on a time-series distribution of the pulses of each period defined by a second set of data, so as to generate the output selection signal.

19 Claims, 14 Drawing Sheets

SYNCHRONIZATION SIGNAL GENERATOR AND IMAGE FORMING APPARATUS

BACKGROUND

1. Technical Field

This disclosure generally relates to synchronization signal generators and, more particularly, to a synchronization signal generator, which generates a pixel clock for switching an image signal supplied to an optical beam modulator at delimitation of pixels, and an image forming apparatus using such a synchronization signal generator.

2. Description of the Related Art

There are known various methods for an image-forming process used in an image forming apparatus, which forms a color image according to electrophocography. Among those methods, there is a method that is referred to as a tandem type. In this method, a photo conductor and an image-forming process element are provided for each color component of a color image to be formed. The photo conductor and the image-forming process element are arranged along an intermediate transfer member and a paper conveyance belt. Images formed in each color component are superimposed on the intermediate transfer member, and the superimposed full-color image is transferred onto a recording paper at once. Alternatively, a color image formed on each photo conductor is transferred onto a recording paper each time the recording paper, which is conveyed by the paper conveyance belt, passes through the transfer process part of each photo conductor so that a full color image is formed by causing the recording paper to pass through all transfer stations.

FIG. 1 shows a structure of a tandem type color image forming apparatus. In FIG. 1, photoconductor drums 6a-6d, which form images in different colors (yellow: Y/y, magenta: M/m, cyan: C/c, black: K/bk), are arranged in a single row along a conveyance belt 10, which conveys a transfer paper (recording paper). According to an image signal for recording, laser beams modulated by image signals for Y, M, C and K recording are projected and scanned on the respective photoconductor drums 6a, 6b, 6c and 6d that have been charged uniformly by an electric charger so as to form electrostatic latent images thereon. Each electrostatic latent image is developed by respective Y, M, C, and K toner in respective developer 7a, 7b, 7c and 7d so as to Form toner images (developed images: visible images) in each color.

The transfer paper is conveyed onto the transfer belt 10 of the transfer belt unit from a paper feed cassette 8. Color images developed on the photoconductor drums are sequentially transferred onto the transfer paper by transfer units 11a, 11b, 11c and 11d in a superimposed state, and are fixed by a fixing device 12. The transfer paper after completion of the transfer is ejected out of the image forming apparatus.

The transfer belt 10 is a transparent endless belt supported by a drive roller 9, a tension roller 13a and an idle roller 13b. Since the tension roller 13a presses down the belt 10 with a spring (not shown in the figure), a tension applied to the belt 10 is substantially constant.

FIG. 2 is a top plan view of an optical unit constituting an exposure unit 5. In FIG. 2, light beams from laser diode units (LD units) 31bk and 31y (each including a laser diode and a laser driver that modulates a laser beam) pass through respective cylinder lenses 32bk and 32y, and are deflected by respective reflection mirrors 33bk and 33y and incident on a surface of a lower side of a polygon mirror 34. The light beams are deflected by the rotating polygon mirror 34, pass through fθ lenses 35bkc and 35ym and are folded by first mirrors 36bk and 36y, respectively.

On the other hand, light beam from laser diode units 31c and 31m pass through respective cylinder lenses 32c and 32m, and are deflected by respective reflection mirrors 33c and 33m and incident on a surface of an upper side of the polygon mirror 34. The light beams are deflected by the rotating polygon mirror 34, pass ,through fθ lenses 35bkc and 35ym and are folded by first mirrors 36c and 36m, respectively.

Cylinder mirrors 37bkc and 37ym and sensors 38bkc and 38ym are provided on an upstream side of a write-start position in the main scanning direction. The light beams passed through the fθ lenses 35bkc and 30ym are reflected and converged by cylinder mirrors 37bkc and 37ym and are incident on the sensors 38bkc and 38ym, respectively. The sensors 38bkc and 38ym serve as synchronization detection sensors for acquiring synchronization in the main scanning direction.

Additionally, cylinder mirrors 39bkc and 39ym and also sensors 40bkc and 40ym are provided on a downstream side of an image area in the main scanning direction. The light beams passed through the fθ lenses 35bkc and 35ym are reflected and converged by cylinder mirrors 39bkc and 39ym and incident on the sensors 40bkc and 40ym, respectively.

Moreover, in the detection of the light beams from the LD units 31bk and 31c, the common sensor 38bkc is used on the write-start side and the common sensor 40bkc is used on the write-end side. Similarly, in the detection of the light beams from the LD units 31y and 31m, the common sensor 38ym is used on the write-start side and the common sensor 40ym is used on the write-end side. Since the light beams for two color images are incident on the same sensor, the incident angles of the light beams of each color are set different from each other so as to vary timings of the light beams entering each sensor, thereby outputting the light beams in a pulse train. As interpreted from the figure, the light beams of K(bk) and C(c) and the light beams Y(y) and M(m) are scanned in opposite directions.

FIG. 3 is a block diagram of a conventional synchronization signal generator. The synchronization signal generator shown in FIG. 3 has PLL (Phase Locked Loop) units 40bk, 40M, 40C and 40Y for each color. In the PLL units 40bk, 40M, 40C and 40Y, a reference clock REFCLK is M-divided by dividers 43bk, 43M, 43C and 43Y (divided to 1/M frequency), and a high-frequency clock *_PLLCLK of the same frequency is N-divided by dividers 45bk, 45M, 45C and 45Y. Signals output from the dividers are supplied to PLL control units 44bk, 44M, 44C and 44Y, each of which comprises a phase comparator, a low-pass filter (LPF) and a voltage-controlled frequency variable oscillator (Vco), so as to generate a high-frequency clock *_PLLCLK for each color. It should be noted that, specifically, the high-frequency clock *_PLLCLK contains K_PLLCLK, M_PLLCLK, C_PLLCLK and Y_PLLCLK. The high-frequency clock *_PLLCLK is K-divided by dividers 41bk, 41M, 41C and 41Y in accordance with a synchronization detection signal *_DETP_N from the above-mentioned synchronization detection sensors 38bkc and 38ym so as to generate pixel clock *_WCLK for each color. The synchronization detection signal *_DETEP_N and the pixel clock *_WCLK are supplied to internal synchronization signal generation units 42bk, 42M, 42C and 42Y so as to generate internal synchronization signal *_PSYNC_N (line synchronization signal) which synchronizes with the pixel clock *_WCLK.

Specifically, the pixel clock *_WCLK includes K_WCLK, M_WCLK, C_WCLK and Y_WCLK. Hereinafter, the pixel clock *_WCLK may be simply referred to as WCLK, and the same may be applied to other signals.

The image forming section of each color controls the output timing of the image signals (switching of image signals)

used for LD modulation in the LD units 31*bk*, 31*m*, 31*c* and 31*y* by using the pixel clock *_WCLK and the internal-synchronization signal (line synchronization signal) *_PSYNC_N.

The frequency fwclk of the pixel clock *_WCLK is represented as fwclk=frefclk/M×N/K. In this expression, frefclk is the frequency of a reference clock REFCLK. Japanese Laid-Open Patent Application No. 2000-221431 discloses a pixel clock generator, which uses a PLL unit for each color.

When performing a magnification correction for main scanning, that is, when performing a frequency correction of the pixel clock *_WCLK so as to equalize a number of pixels on each color line, the pixel clock *_WCLK is counted after the front-end (start) detection sensors 38*bkc* and 38*ym* detect the light beams and until the rear-end (end) detection sensors 39*bkc* and 39*ym* detect the light beams. Then, the values of M and N are adjusted so that the count value becomes equal to a predetermined reference count value. That is, the frequency of the pixel clock *_WCLK is adjusted so as to equalize the number of pixels on each color line. Japanese Lad-Open Patent Application No. 2002-096502 discloses an exposure apparatus which performs the above mentioned magnification correction of main scanning.

It is possible to adjust a magnification (number of pixels) of whole one line by the magnification correction, which is for changing the frequency of the pixel clock. However, it is difficult to correct a local expansion and contraction (positional offset of pixels in the main scanning direction) due to positional inaccuracy of the optical lenses (fθ lens) and mirrors in the optical system. Japanese Patent No. 3231610 discloses a method of correcting an expansion and contraction in a width of an image in the main scanning direction. In this method, three kinds of clocks having a reference period, a period shorter than the reference period and a period longer than the reference period are prepared so as to increase and decrease the width of pixel (pixel-width) by selectively setting one of the clocks in accordance with a main scanning position (position of a pixel in the main scanning direction).

If the PLL unit is provided for each color, provision of many PLL units may increase a cost. If both the magnification correction in the main scanning direction and the correction of pixel-width in the main scanning direction are performed simultaneously, and when data for magnification correction in the main scanning direction and data for correction of expansion and contraction of pixel-width (variation in the pixel-width) are synthesized by superimposing them by developing on a memory as disclosed in the above mentioned Japanese Patent No. 3231610, a large capacity of memory for one line is needed which results in a cost increase. In a case where the magnification correction in the main scanning direction is performed between pages, if the set value of the PLL is changed, a considerable time period is needed until the PLL becomes stable, which decreases productivity in continuous printing.

SUMMARY

In an aspect of this disclosure, there is provided a synchronization signal generator and an image forming apparatus using such a synchronization signal generator, which can easily generate a pixel clock that enables both a magnification correction in a main scanning direction and a correction of expansion and contraction of pixel width in the main scanning direction.

In another aspect of this disclosure, there is provided a synchronization signal generator comprising high-frequency clock generating means (40) for generating a high-frequency clock (PLLCLK) based on a reference clock (REFCLK) and a synchronization detection signal (DETP_N), and a plurality of pixel clock generators each of which generates a clock signal (WCLK) based on the high-frequency clock signal and the synchronization detection signal (DETP_N), wherein each of the pixel clock generators includes pixel clock generating means (51) for dividing a frequency of the high-frequency clock (PLLCLK) so as to generate pulses of a reference period (0dot), a long period (+⅛ dot) longer than the reference period and a short period (−⅛ dot) shorter than the reference period, and outputting as a pixel clock (WCLK), one of the pulses that is designated by an output selection signal (PWMDAT), first selection means (55) for outputting a first selection signal (PWM1), which selectively designates one of the pulses, in synchronization with the pixel clock (WCLK) in accordance with a time-series distribution of the pulses of each period defined by a first set of data (A, B, C), second selection means (56) for outputting a second selection signal (PWM2), which selectively designates one or the pulses, in synchronization with the pixel clock (WCLK) in accordance with a rime-series distribution of the pulses of each period defined by a second set of data (A0-A3, B0-B3, C0-C3, D), and synthesizing means (54) far synthesizing the First selection signal (PWM1) and the second selection signal (PWM2) so as to generate the output selection signal (PWMDAT) and output the output selection signal to the pixel clock generating means (51).

It should be noted that reference numerals in parentheses are inserted for the sake of easy understanding and only for reference, and the present invention is not limited by the elements indicated by the reference numerals.

In a preferred embodiment, the designation of the output pulses according to the first selection signal (PWM1) changes in accordance with the time-series distribution of the pulses of each period defined by the first set of data (A, B, C). Thus, if the pulses are output us the pixel clock (WCLK) in accordance with the first selection signal (PWM1), a main-scanning magnification can be corrected by adjusting the first set of data (A, B, C).

Additionally, the designation of the output pulses according to the second selection signal (PWM2) changes in accordance with the time-series distribution of the pulses of each period defined by the second set of data (A0-A3, B0-B3, C0-C3, D). Thus, if the pulses are output as the pixel clock (WCLK) in accordance with the second selection signal (PWM2), an expansion and contraction (variation) of a pixel-width (pixel-width variation) can be corrected by adjusting the second set of data (A0-A3, B0-B3, C0-C3, D).

Since the synthesizing means (54) synthesizes the first selection signal (PWM1) and the second selection signal (PWM2) so as to generate the output selection signal (PWMDAT) and output the output selection signal to the pixel clock generating means (51), both the main-scanning magnification correction and the pixel-width variation correction can be performed.

Additionally, since only one high-frequency clock generating means (40) is needed, a hardware structure of the synchronization signal generator is simplified.

In another aspect of this disclosure, there is provided a synchronization signal generator comprising, in an exemplary embodiment, high-frequency clock generating means (40) for generating a high-frequency clock (PLLCLK) based on a reference clock (REFCLK) and a synchronization detection signal (DETP_N), and a pixel clock generator that generates a clock signal (WCLK) based on the high-frequency clock signal and the synchronization detection signal (DETP_N), wherein the pixel clock generator includes pixel clock generating means (51) for dividing a frequency of rho high-frequency clock (PLLCLK) so as to generate pulses of a reference period (0dot), a long period (+⅛ dot) longer than the reference period and a short period (−⅛ dot) shorter than the reference period, and outputting, as the pixel clock (WCLK), one of the pulses that is designated by output selection, data (PWMDAT), first selection means (55) for outputting first selection data (PWM1), which selectively designates one of the pulses, in synchronization with the pixel clock (WCLK) in accordance with a time-series distribution of the pulses of each period defined by a first set of data (A, B, C), second selection means (56) for outputting second selection data (PWM2), which selectively designates one of the pulses, in synchronization with the pixel clock (WCLK) in accordance with a time-series distribution of the pulses of each period defined by a second set or data (A0-A3, B0-B3, C0-C3, D), and synthesizing means (54) for adding the first selection signal (PWM1) and the second selection signal (PWM2) so as to generate the output selection darn (PWMDAT) and output the output selection data of the pixel clock generating means (51).

In such embodiment of the present invention, since the synthesizing means (54) synthesizes the first selection data (PWM1) and the second selection data (PWM2) by summing them, there is no need to develop the first selection data (PWM1) and the second selection data (PWM2) on a line memory. Thus, a memory capacity can be saved, and the first selection data (PWM1) and the second selection data (PWM2), which are generated in a Raster mode (changes in time-series), can be synthesized in real time. Accordingly, reading and writing of the first selection data (PWM1) and the second selection data (PWM2) with respect to a memory can be omitted, which simplifies the signal processing.

In the above-mentioned synchronization signal generator, values of the output selection data designating the reference period, the long period and the short period are equal to numerical values a, b and c, respectively, and the synthesizing means (54) sets the output selection data (PWMDAT) to the value a when a result of addition is a×2 or b+c, and to the value a when a result of addition is a+b, and the synchronization means (54) sets the output selection data (PWMDAT) to the value b and carries over a remainder b to a following pixel when a result of addition is b×2, and the synchronization means (54) sets the output selection data (PWMDAT) to the value c and carries over a remainder c to a following pixel when a result of addition is c×2.

Accordingly, the output selection data (PWMDAT), which expresses both the first selection data (PWM1) and the second selection data (PWM2) relatively accurately, can be obtained by a simple addition and encoding (data conversion) of a part of data obtained by the addition.

In another aspect of this disclosure, there is provided a synchronization signal generator comprising high-frequency clock generating means (40) for generating a high-frequency clock (PLLCLK), and a pixel clock generator, wherein the pixel clock generator includes pixel clock generating means (51) for dividing a frequency of the high-frequency clock (PLLCLK) so as to generate pulses of a reference period (0dot), a long period (+⅛ dot) longer than the reference period and a short period (+⅛ dot) shorter than the reference period, and outputting, as a pixel clock (WCLK), one of the pulses that is designated by output selection data (PWMDAT), first selection means (55) for outputting first selection data (PWM1), which selectively designates one of the pulses, in synchronization with the pixel clock (WCLK) in accordance with a time-series distribution of the pulses of each period defined by a first set of data (A, B, C), second selection means (56) for outputting second selection data (PWM2), which selectively designates one of the pulses, in synchronization with the pixel clock (WCLK) in accordance with a time-series distribution of die pulses of each period defined by a second set of data (A0-A3, B0-B3, C0-C3, D), and synthesizing means (54) for synthesizing the first selection data (PWM1) and the second selection data (PWM2) so as to generate the output selection data (PWMDAT), wherein values of the data designating the pluses of the reference period (0dot), the long period (+⅛ dot)longer than the reference period and the short period (−⅛ dot) shorter than the reference period are set to numerical values a, b and c, respectively, and wherein the synthesizing means (54) sets the output selection data (PWMDAT) to the value a(0) when both the first selection data (PWM1) and the second selection data (PWM2) are a, and sets to the value b when one of the first selection data (PWM1) and the second selection data (PWM2) is a and the other is b, the synthesizing means (54) sets the output selection data (PWMDAT) to the value b and carries over a remainder b to a following pixel when both the first selection data (PWM1) and the second selection data (PWM2) are b, and sets to the value a when one of the first selection data (PWM1) and the second selection data (PWM2) is b and the other is c, and the synthesizing means (54) sets the output selection data (PWMDAT) to the value c and carries over a remainder c to a following pixel when both the first selection data (PWM1) and the second selection data (PWM2) are c.

Accordingly, the output selection data (PWMDAT), which expresses both the first selection data (PWM1) and the second selection data (PWM2) relatively accurately, can be obtained by a simple addition and encoding (data conversion) of a part of data obtained by the addition.

In the above-mentioned synchronization signal generator, the values a, b and c may be set to 0, 1 and 3, respectively. Accordingly, the addition and the encoding can be simplified very much.

Additionally, in the above-mentioned synchronization signal generator, a plurality of the pixel clock generators may be provided that shares the single high-frequency clock generating means (40). Since only one high-frequency clock generating means (40) is provided, a hardware structure of the synchronization signal generator is simplified accordingly.

In another aspect of there is provided an image fanning apparatus comprising charging means for electrically charging a plurality of photoconductors (6a-6d), a synchronization signal generator (135), optical modulation means (31y, 31m, 31c, 31bk) for switching image signals for image forming of each color in synchronization with each pixel clock (K_, M_, C_, Y_WCLK) generated by each clock generator (51, 53bk, 53m, 53c, 53y) of the synchronization signal generator (135), and radiating light beams corresponding to the image signals, an exposure optical system (5) that projects and scans the light beams on the respective photoconductors, developing means (7a-7d) for developing a latent image on each of the photoconductors with each color toner to form visible images of each color, transfer means (10, 11a-11d) for transferring the visible images on a transfer sheet in an overlapping state, front end synchronization detection means (38y, 38m, 38c, 38bk) for detecting each light beam for each color image farming projected on a front end of each main-scanning line for each color image forming so as to generate a end detection signal for each main-scanning line, rear end synchronization detection moans (40y, 40m, 40c, 40bk) for detecting each light beam for each color image forming projected on a rear end of each main-scanning line for each color image forming so as to generate a rear end detection signal for each main-scanning line, and main-scanning magnification correction means (131) for measuring an interval from the front end detection signal to the rear end detection signal for at lest one color, and operating the first set of data (A, B, C) addressed to each color in accordance with a measured value of the interval.

The effects obtained with the above-mentioned synchronization signal generators can also be obtained in the image forming apparatus.

In the above-mentioned image forming apparatus, a measurement of the interval may be performed by counting the high-frequency clock (PLLCLK) from a time when the front end detection signal is generated until a time when the rear end detection signal is generated.

In the image forming apparatus according to a preferred embodiment, the reference period (0dot), the long period (+⅛ dot) and the short period (−⅛ dot) are generated by dividing the frequency of the high-frequency clock (PLLCLK). Accordingly, since the length of the main-scanning line and the variation of the pixel-width are adjusted based on differences in period between the three kinds of pulses, the interval can be measured based on the same unit of measurement as the differences in period. Thereby, the length of the main-scanning line and the distribution of variation of the pixel-width can be accurately adjusted, which results in an accurate main-scanning magnification correction and an accurate pixel-width variation correction.

In the image forming apparatus according to the preferred embodiment, the main-scanning magnification correction means (131) may adjust the frequency (M, N) of the high-frequency clock (PLLCLK) so that the measurement value with respect to the light beam of a reference color (bk) matches reference value, and the main-scanning magnification correction means (131) also adjusts a number (A) of pixels to which the pulses of the long period (+⅛ dot) or the short period (−⅛ dot) contained in the first set of data (A, B, C) and an interval of insertion.

According to the above-mentioned preferred embodiment, the pixel clock used for the reference color (bk) is set to be a reference main-scanning magnification by adjustments of the frequency (M, N) of the high-frequency clock (PLLCLK) as a unit of pulse period. On the other hand, the pixel clocks used for other colors are set to be the reference main-scanning magnification by an operation applied to the first set of data (A, B, C). Thereby, the main-scanning magnification is matched to the reference design value, and the main-scanning magnification of other colors is matched to the main-scanning magnification of the reference color (bk). In this case, since setting value of PLL is changed for adjustment of the frequency (M, N) of the high-frequency clock (PLLCLK), it needs a certain time until the PLL becomes stable, that is a considerable time is spent on the main-scanning magnification correction. However, according to the preferred embodiment, the fundamental period of the pixel clock can be the reference design value by which the main-scanning magnification is determined.

In the image forming apparatus according to the preferred embodiment, when the main-scanning magnification correction between pages is specified, in the main-scanning magnification correction, the main-scanning magnification correction means (131) may adjust a number (A) of pixels to which the pulses of the long period (+⅛ dot) or the short period (−⅛ dot) contained in the first set of data (A, B, C) and an interval of insertion with respect to the light beams for each color in accordance with a difference between the measured valued and the reference value.

According to the above-mentioned preferred embodiment, the main-scanning magnification of each color is marched individually to the reference design value. In this case, since the frequency (M, N) of the high-frequency clock (PLLCLK) is not adjusted, the fundamental period of the pixel clock shifts from the reference design value. Therefore, the main-scanning magnification may be matched to the reference value by adjusting the number of pulses (C) of the long period (+⅛ dot) or the short period (−⅛ dot), which may result in a variation of the pixel width in its entirety. However, such a variation is extremely small in practice. Since the setting of PLL is not changed, the main-scanning magnification correction is completed in a short time. Thus, there is only a small decrease in productivity when a continuous printing is performed with the main-scanning magnification correction applied between pages.

In another aspect of this disclosure, an image forming apparatus comprising modulation means (31y, 31m, 31c, 31bk) for modulating each of light beams emitted from a plurality of light sources, front end synchronization detection means (38y, 38m; 38c, 38bk) for generating a synchronization signal providing a reference for a main-scanning line, and rear end synchronization detection means (40y, 40m; 40c, 40bk) for detecting a position of a rear end of one line, wherein an image is formed on a photoconductor by irradiating the light beams onto the photoconductor through a scanner optical system, and a main-scanning magnification correction is performed according to a result of measurement of an interval between a front end synchronization detection signal (PSYNCN) and a roar end synchronization detection signal (PSYNCN), the image forming apparatus further comprising high-frequency clock generation means (40) common to the plurality of light beams for generating a high-frequency clock (PLLCLK), which corresponds to a setting value, from a reference clock, wherein the high-frequency clock generation means (40) includes pixel clock generation means (51y, 51m, 51c, 51bk) for generating one of a reference period, a short period shorter than the reference period and a long period longer than the reference period on an individual pixel basis by dividing a frequency of the high-frequency clock, and pixel clock control means (53y, 53m, 53c, 53bk) for controlling designation information (a number of pixels that do not have the reference period, an interval of insertion of the pixel) to the pixel clock generation means on an individual pixel basis, wherein the pixel clock control means includes a first control unit (a magnification error correction unit 55y, 55m, 55c, 55bk) that corrects the pixel clock in accordance with a result of measurement (A, B, C) of an interval between the front end synchronization detection signal and the rear end synchronization detection signal so as to correct a magnification error in one line4 a second control unit (pixel-width variation correction unit 56y, 56m, 56c, 56bk) that corrects me pixel clock in accordance with expansion and contraction distortion data (A0-A3, B0-B3, C0-C3) previously acquired so as to correct an expansion and contraction distortion due to characteristics of the optical system, and a pixel clock correction data synthesizing unit (54y, 54m, 54c, 54bk) that synthesizes main-scanning magnification correction data and pixel-width variation correction data (PWM1[1:0], PWM2[1:0]), wherein a color offset between each color is corrected by adjusting the number of pixels that do not have the reference period and the interval of insertion of the pixels.

According to the above-mentioned image forming apparatus, since the common PLL is shared by the pixel clock generation units of the plurality of light beams, the main-scanning magnification error correction can be achieved at a low cost. Moreover, since the pixel clock is generated based on the pixel clock correction data, which is obtained by synthesizing the magnification error correction data and the magnification difference correction data, an image having less color of Net can be formed.

In the above-mentioned image forming apparatus, the high-frequency clock (PLLCLK) may be used as a clock for measuring the interval between the front end synchronization detection signal and the rear end synchronization detection signal. The frequency of the high-frequency clock (PLLCLK) may be adjusted based on a reference color (bk) before performing the main-scanning magnification correction. When performing the main-scanning magnification correction between pages, the main-scanning magnification correction for the reference color (bk) may be performed by controlling the number of pixels to which the pixel clock that do not have the reference period is applied and the interval of insertion of the pixels. Accordingly, since the main-scanning magnification correction is performed without changing the frequency of PLL even when performing the main-scanning magnification correction between pages, a print can be performed with a page interval the same as that of normal printing, which prevents a deterioration in productivity.

In another aspect of this disclosure, there is provided a method of generating a synchronize ion signal, comprising generating a high-frequency clock (PLLCLK) based on a reference clock (REFCLK) and a synchronization detection signal (DETP_N), dividing a frequency of the high-frequency clock (PLLCLK) so as to generate pulses of a reference period (0dot), a long period (+⅛ dot) longer than the reference period and a short period (−⅛ dot) shorter than the reference period, and outputting, as a pixel clock (WCLK), one of the pulses that is designated by an output selection signal (PWMDAT), generating a first selection signal (PWM1), which selectively designates one of the pulses, in synchronization with the pixel clock (WCLK) in accordance with a time-series distribution of the pulses of each period defined by a first set of data (A, B, C), generating a second selection signal (PWM2), which selectively designates one of the pulses, in synchronization with the pixel clock (WCLK) in accordance with a time-series distribution of the pulses of each period defined by a second set of data (A0-A3, B0-B3, C0-C3, D), synthesizing the first selection signal (PWM1) and the second selection signal (PWM2) so as to generate the output selection signal (PWMDAT), and generating the synchronization signal (PSYCN_N) in accordance with the pixel clock (WCLK) and the synchronization detection signal (DETP_N).

In another aspect of this disclosure, there is provided a method of generating a synchronization signal, comprising generating a high-frequency clock (PLLCLK) based on a reference clock (REFCLK) and a synchronization detection signal (DETP_N), dividing a frequency of the high-frequency clock (PLLCLK) so as to generate pulses of a reference period (0dot), a long period (+⅛ dot) longer than the reference period and a short period (−⅛ dot) shorter than the reference period, and outputting, as the pixel clock (WCLK), one of the pulses that is designated by output selection data (PWMDAT), generating first selection data (PWM1), which selectively designates one of the pulses, in synchronization with the pixel clock (WCLK) in accordance with a time-series distribution of the pulses of each period defined by a first set of data (A, B, C), generating second selection data (PWM2), which selectively designates one of the pulses, in synchronization wit the pixel clock (WCLK) in accordance with a time-series distribution of the pulses of each period defined by a second set of data (A0-A3, B0-B3, C0-C3, D), summing the first selection signal (PWM1) and the second selection signal (PWM2) so as to generate and output the output selection data (PWMDAT), and generating the synchronization signal (PSYCN_N) in accordance wit the pixel clock (WCLK) and the synchronization detection signal (DETP_N).

In another aspect of this disclosure, there is provided a method of generating a synchronization signal, comprising generating a high-frequency clock (PLLCLK) based on a reference clock (REFCLK) and a synchronization detection signal (DETP_N), dividing a frequency of the high-frequency clock (PLLCLK) so as to generate pulses of a reference period (0dot), a long period (+⅛ dot) longer than the reference period and a short period (−⅛ dot) shorter than the reference period, and outputting, as a pixel clock (WCLK), one of the pulses that is designated by output selection data (PWMDAT), generating first selection data (PWM1), which selectively designates one of the pulses, in synchronization with the pixel clock (WCLK) in accordance with a time-series distribution of the pulses or each period defined by a first set of data (A, B, C), generating second selection data (PWM2), which selectively designates one of the pulses in synchronization with the pixel clock (WCLK) in accordance with a time-series distribution of the pulses of each period defined by a second set of data (A0-A3, B0-B3, C0-C3, D), synthesizing the first selection data (PWM1) and the second selection data (PWM2) so as to generate the output selection data (PWMDAT), and generating the synchronization signal (PSYCN_N) in accordance with the pixel clock (WCLK) and the synchronization detection signal (DETP_N), wherein values of the data designating the pluses of the reference period (0dot), the long period (+⅛ dot) longer than the reference period and the short period (−⅛ dot) shorter than the reference period are set to numerical values a, b and c, respectively, and wherein the step of synthesizing includes setting the output selection data (PWMDAT) to the value a when both the first selection data (PWM1) and the second selection data (PWM2) are a, and sets to the value b when one of the first selection data (PWM1) and the second selection data (PWM2) is a and the other is b, setting the output selection data (PWMDAT) to the value b and carries over a remainder b(1) to a following pixel when built the first selection data (PWM1) and the second selection data (PWM2) are b, and sets to the value a when one of the first selection data (PWM1) and the second selection data (PWM2) is b and the other is c, and setting the output selection data (PWMDAT) to the value c and carries over a remainder c to a following pixel when both the first selection data (PWM1) and the second selection data (PWM2) are c.

In another aspect of this disclosure, there is provided a method of forming an image, comprising electrically charging a plurality of photoconductors (6a-6d), generating a line synchronization signal according to the above-mentioned method of forming an image, switching image signals fur image forming of each color in synchronization with each pixel clock (K_, M_, C_, Y_WCLK), and radiating light beams corresponding to the image signals, projecting and scanning the light beams on the respective photoconductors, developing a latent image on each of tile photoconductors with each color toner to form visible images of each color, transferring the visible images on a transfer sheet in an overlapping state, detecting each light beam for each color image forming projected on a front end of each main-scanning line for each color image forming so as to generate a front end detection signal for each main-scanning line, detecting each light beam for each color image forming projected on a rear end of each main-scanning line for each color image forming so as to generate a rear end detection signal for each main-scanning line, and measuring an interval from the front end detection signal to the rear end detection signal for at lest one color, and operating the first set of data (A, B, C) addressed to each color in accordance with a measured value of the interval.

In another aspect of this disclosure, there is provided a method of forming an image, comprising modulating each of light beams emitted from a plurality of light sources, generating a synchronization signal providing a reference for a main-scanning line, and detecting a position of a rear end of one line, wherein an image is fanned on a photoconductor by irradiating the light beams onto the photoconductor through a scanner optical system, and a main-scanning magnification correction is performed according to a result of measurement of an interval between a front end synchronization detection signal (PSYNCN) and a rear end synchronization detection signal (PSYNCN), the method further comprising generating a high-frequency clock (PLLCLK), which corresponds to a setting value, from a reference clock, generating one of a reference period, a short period shorter than the reference period and a long period longer than the reference period on an individual pixel basis by dividing a frequency of the high-frequency clock, controlling designation information (a number of pixels that do not have the reference period, an interval of insertion of the pixel) to the pixel clock generation means on an individual pixel basis, correcting the pixel clock in accordance with a result of measurement (A, B, C) of an interval between the front end synchronization detection signal and the rear end synchronization detection signal so as to correct a magnification error in one line, correcting the pixel clock in accordance with expansion and contraction distortion data (A0-A3, B0-B3, C0-C3) previously acquired so as to correct an expansion and contraction distortion due to characteristics of the optical system, synthesizing main-scanning magnification correction data and pixel-width variation correction data (PWM1[1:0], PWM2[1:0]), and correcting a color offset between each color is corrected by adjusting the number of pixels that do nor have the reference period and the interval of insertion of rho pixels.

Other aspects, features and advantages of the present invention will become more apparent from the following detailed description when read in conjunction with the accompanying drawings.

DETAILED DESCRIPTION OF THE PREFERRED EMBODIMENTS

Figure 4:
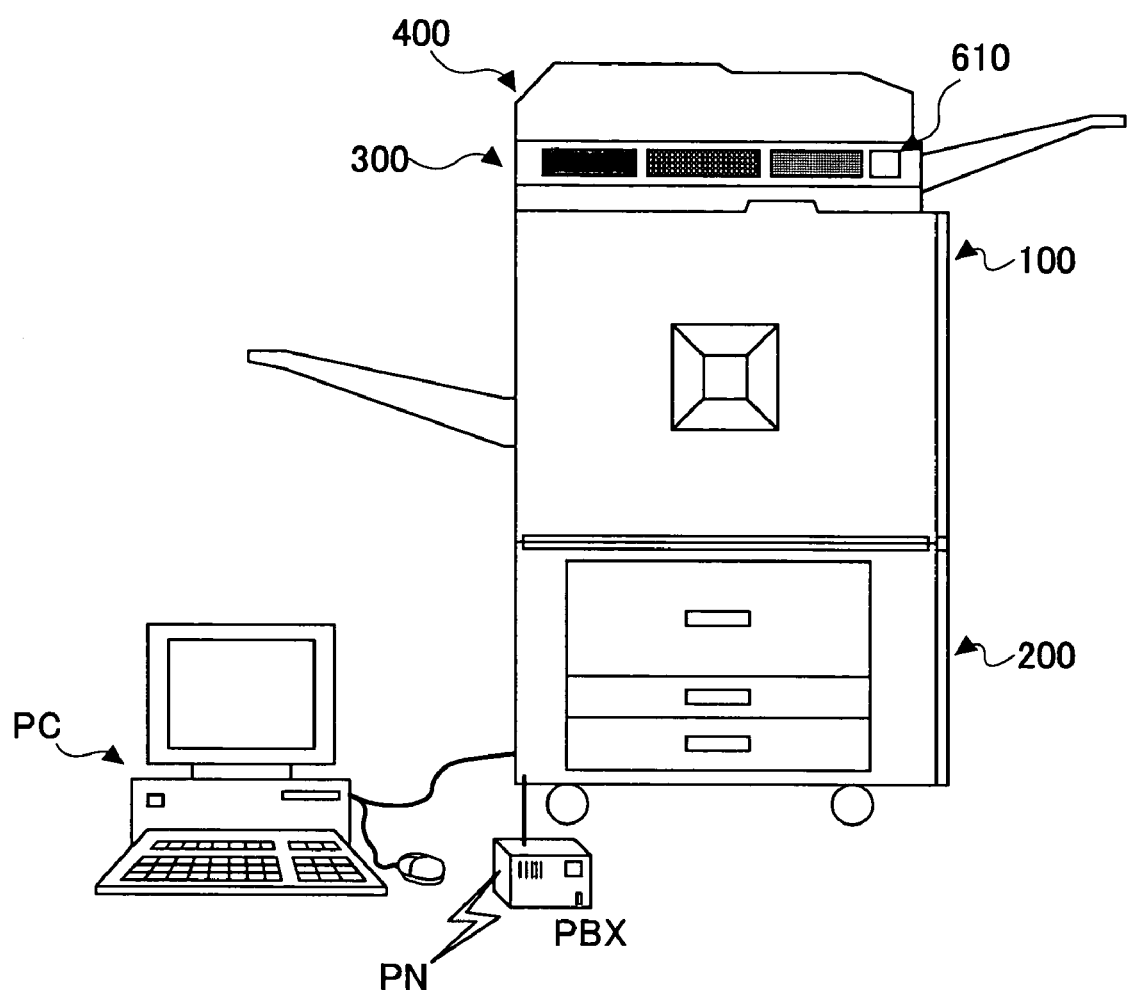
FIG. 4 is an illustration of an outer configuration of a complex function full-color digital copy machine according to an embodiment of the present invention.

FIG. 4 shows an outer configuration of a complex function full-color digital copy machine according to an embodiment of the present invention. The full-color copy machine generally comprises an automatic document feeder (ADF) 400, an operation board 610, a color scanner 300, a color printer 100 and a paper feed table 200. A local area network (LAN), to which a personal computer (PC) is connected, is connected to a system controller 630 (refer to FIG. 5) provided in the copy machine. The system controller 630 can be connected to a communication network (for example, the Internet) so as to communicate with a management server of a management center) not shown in the figure) through the network. Moreover, a facsimile controller, FCU (refer to FIG. 5) in the copy machine is capable of performing a facsimile communication through an exchanger PBX and a public communication network PN.

Figure 5:
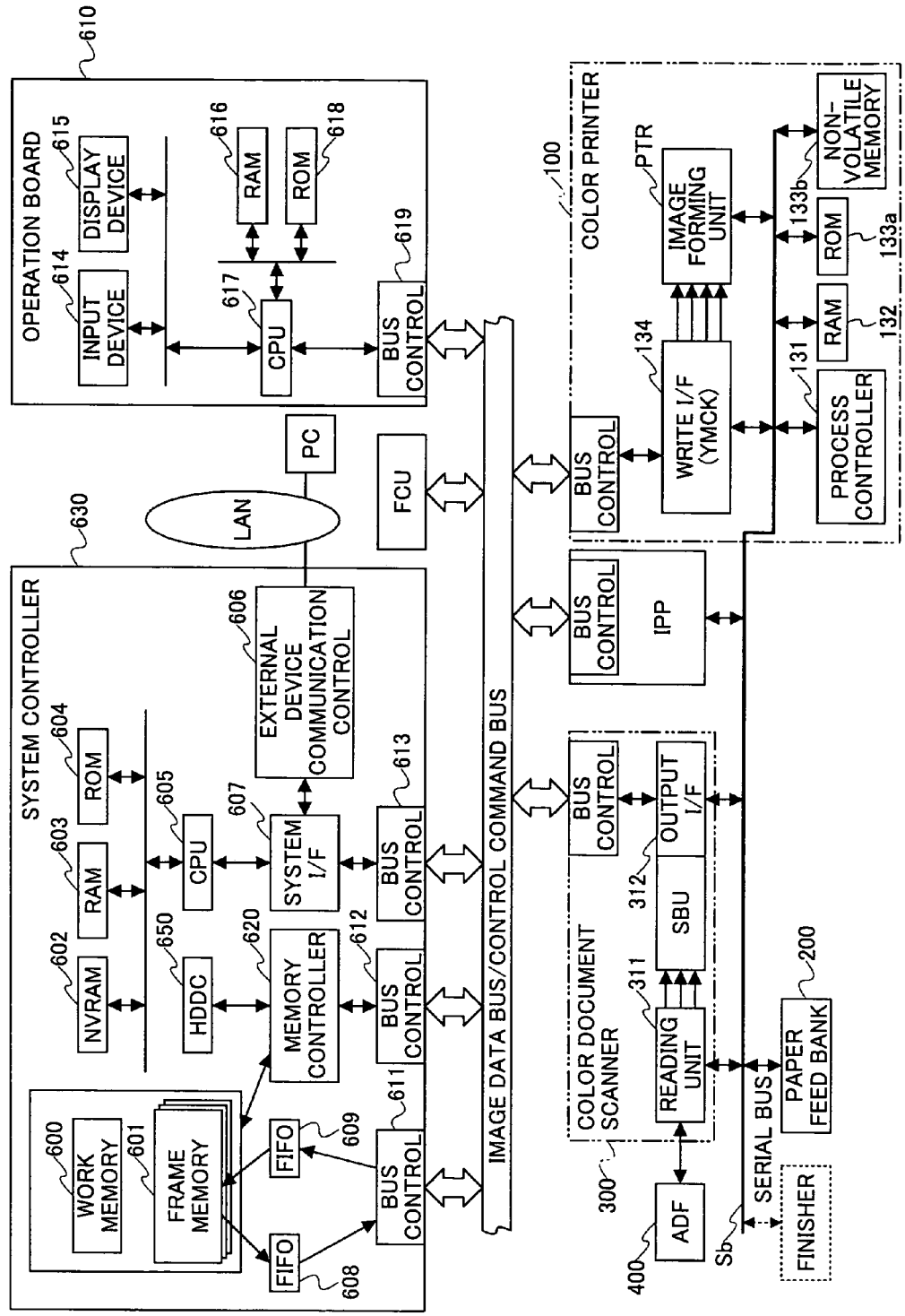
FIG. 5 is a block diagram of the pixel clock control shown in FIG. 4.

FIG. 5 is a block diagram of a system that performs an image reading, processing, accumulating and forming operation of the copy machine shown in FIG. 4. A reading unit 311 of the color scanner 300, which optically reads a document, scans a document illumination light source for a document so as to form, an image of the document on a charge coupled device (CCD) of a sensor board unit (SBU). The document image, that is, the reflected light from the document is photoelectric-converted by the CCD so as to generate R, G, B image signals. The R, G, B image signals are photoelectric-converted into RGB image data by the SBU, and a shading correction is applied to the RGB image data. Then, the RGB image data is sent to an image processing processor (IPP) by an output interface (I/F) 312 through an image data bus.

The IPP performs various processes on the image data, such as separation processing (determination as to whether an image part is a character image or a picture image: image area separation), background elimination, a scanner gamma conversion, filtering, a color correction, scaling, an image change or a printer gamma conversion. The IPP is a programmable operation processing means that performs image processing. The image data transmitted to the IPP from the scanner 300 is subjected to a correction of signal degradation (signal degradation of the scanner system) associated with the optical system and the quantization to a digital signal in the IPP, and the corrected image-data is written in a frame memory 601.

The system controller 630 has functions of a plurality of applications, such as a scanner application, a facsimile application, a printer application and a copy application, and controls the entire system of the copy machine. An operation panel control apparatus 631 decodes an input of the operation board 610 and displays a setup of the system and its contents.

An image data bus and a control command bus are busses for transmitting image data and control commands, respectively, in a time-sharing mode.

A CPU 605 of the system controller 630 controls an operation of the system controller 630. A control program of the system controller 630 is written in a ROM 604. A RAM 603 is used as a work memory for the CPU 605. A non-volatile memory (NVRAM) 602 stores information regarding the entire system.

An external apparatus communication control 606 controls communications with the management server of the management center and an external apparatus (for example, a copy machine of the same kind, an image scanner, a personal computer, a printer, a facsimile) which requests accumulation of image data or printing of an image, and also controls a physical I/F for connection to the network. When the external apparatus communication control 606 connected to the network receives data from the network, the external apparatus communication control 606 sends only contents of communication data of the electric signal to the system I/F 607. The system I/F 607 logically converts the received data according to a specified protocol, and sends the converted data to the CPU 605. The CPU 605 determines and processes the received data, which has been logically converted. When the CPU 605 sends data to the network, in an inverse procedure of-the reception, the data is transmitted to the system I/F 607 and the external apparatus communication control 606, and is sent to the network as an electrical signal.

The system I/F 607 performs a transmission control of document read data, facsimile reception data and document data (print command) of a personal computer that are processed in the system according to commands of the CPU 605. Moreover, the system I/F 607 converts the document data of the personal computer into image data for printing, and transmits the converted data. The work memory 600 is a work memory for development (conversion of document data into image data) of image data used by the printer. A frame memory 601 is a work memory for temporarily storing image data of a read image or write image, which is immediately printed in a state where an electric power is continuously supplied.

A hard disk drive controller (HDDC) 650 comprises a hard disk drive (HDD), which is used for an application database and an image database, and a controller for the HDD. The application database stores application programs of the system and attribute information of an image-forming apparatus of the printer 100. The image database stores image data of a read image or a write image and document data. The image data and the document data may be encoded dot-image data. A FIFO buffer memory 609 performs a data transfer rate conversion when writing an input image in a frame memory 601. Namely, the FIFO buffer memory 609 stores temporarily the data for absorbing a difference in timing between data transmission from a transferor and data reception by a transferee, a difference in an amount of data on a transfer unit basis and a difference in transfer rate. Then, the FIFO buffer memory 609 receives data at a transfer timing and rate of the transferor, and sends data at a transfer timing and rate of the transferee. Similarly, the FIFO buffer memory 608 performs a rate conversion when transferring the image data of the frame memory 601 as an output image.

A memory controller 610 controls input and output of the image data between a bus and each of the frame memory 601 and the HDDC 650 without a control of the CPU 605. Moreover, the memory controller 610 edits, processes or synthesizes the image data stored in the HDDC 650 using the frame memory 601 in accordance with commands received by an input device 614 of the operation board 610. A memory controller 620 controls reading of image information from the HDD of the HDDC 650 to the work memory 600 or the frame memory 601. The memory controller 620 also controls a change in printing direction of an image relative to a transfer paper, a rotation of an image and a combination and edition of images. The memory controller 620 also controls a concentration change for the image data according to four rules of arithmetic and an image trimming and synthesis according to logical AND operation or a logical OR operation between of sets of data. Further, the memory controller 620 can perform various image processes and edition by writing the thus-processed image information in the HDD.

A CPU 617 performs an input and output control of the operation board 610. That is, the CPU 617 controls input reading and display outputting of operation board 610. A control program of the operation board 610 is written in a ROM 616. A RAM 618 is a work memory for the CPU 617. An input device 614 includes input keys and an input panel of the operation board 610 operated by a use to input system setting information. A display device 615 is provided in the operation board 610 so as to display the system setting information and information regarding a status. The display device 615 includes a display light and a display panel having a input function.

Figure 1:
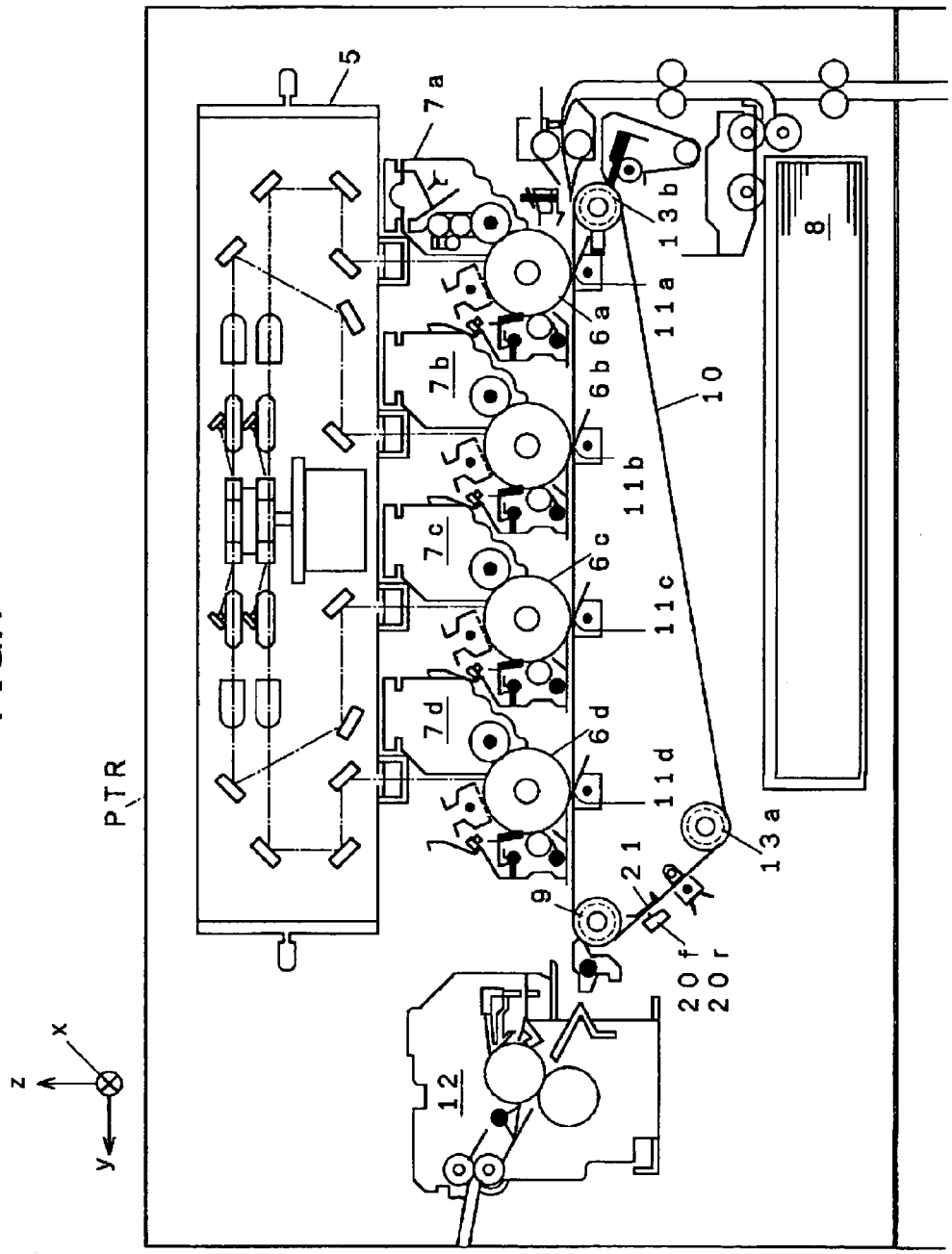
FIG. 1 is a diagram showing a structure of a tandem type color image forming apparatus.
Figure 2:
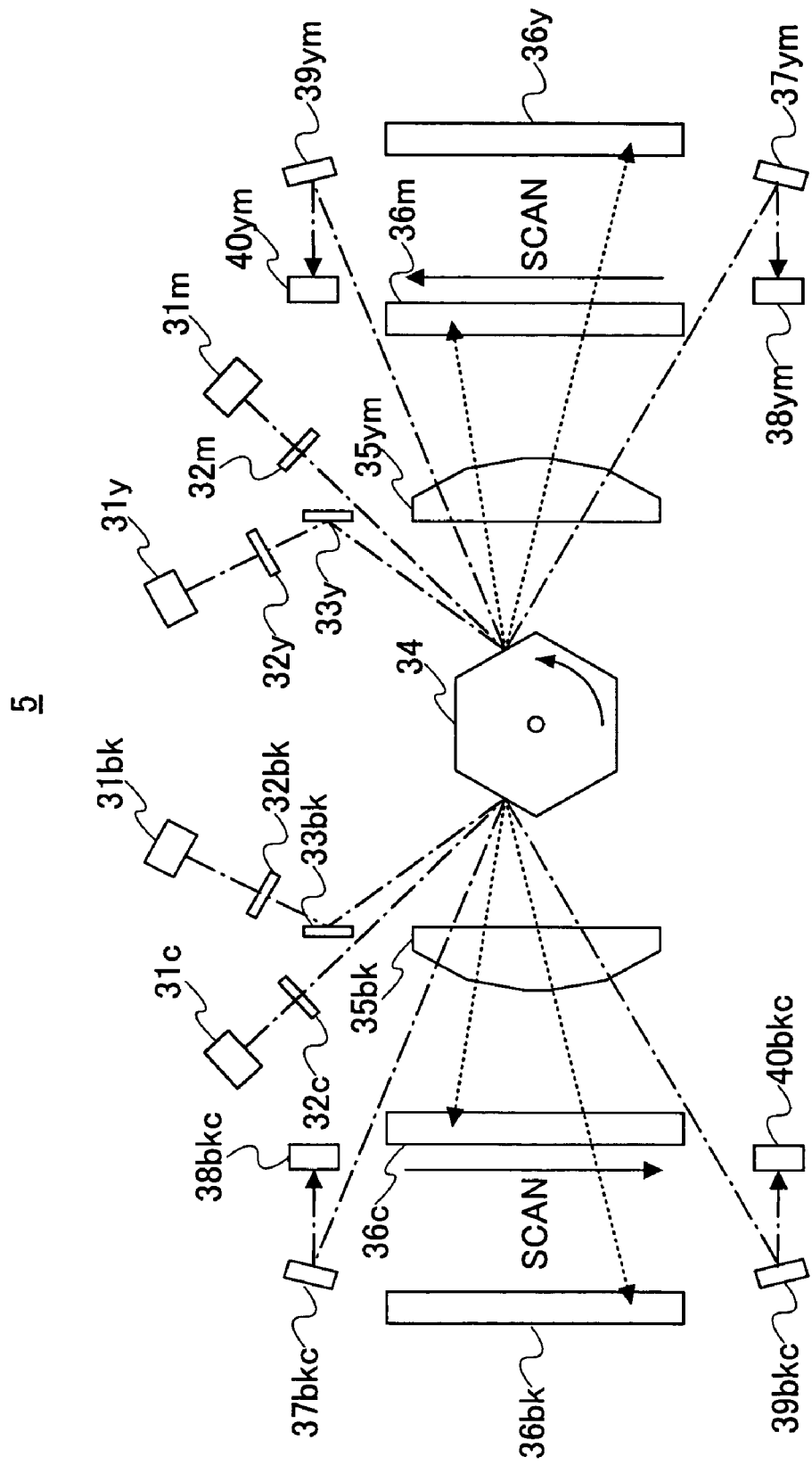
FIG. 2 is a top plan view of an optical unit constituting an exposure unit.

An image forming unit PTR includes the image forming mechanism shown in FIG. 1 that was mentioned above. Additionally, the exposure device 5 of the image forming unit PTR has the structure shown in FIG. 2 that was already mentioned above.

Figure 6:
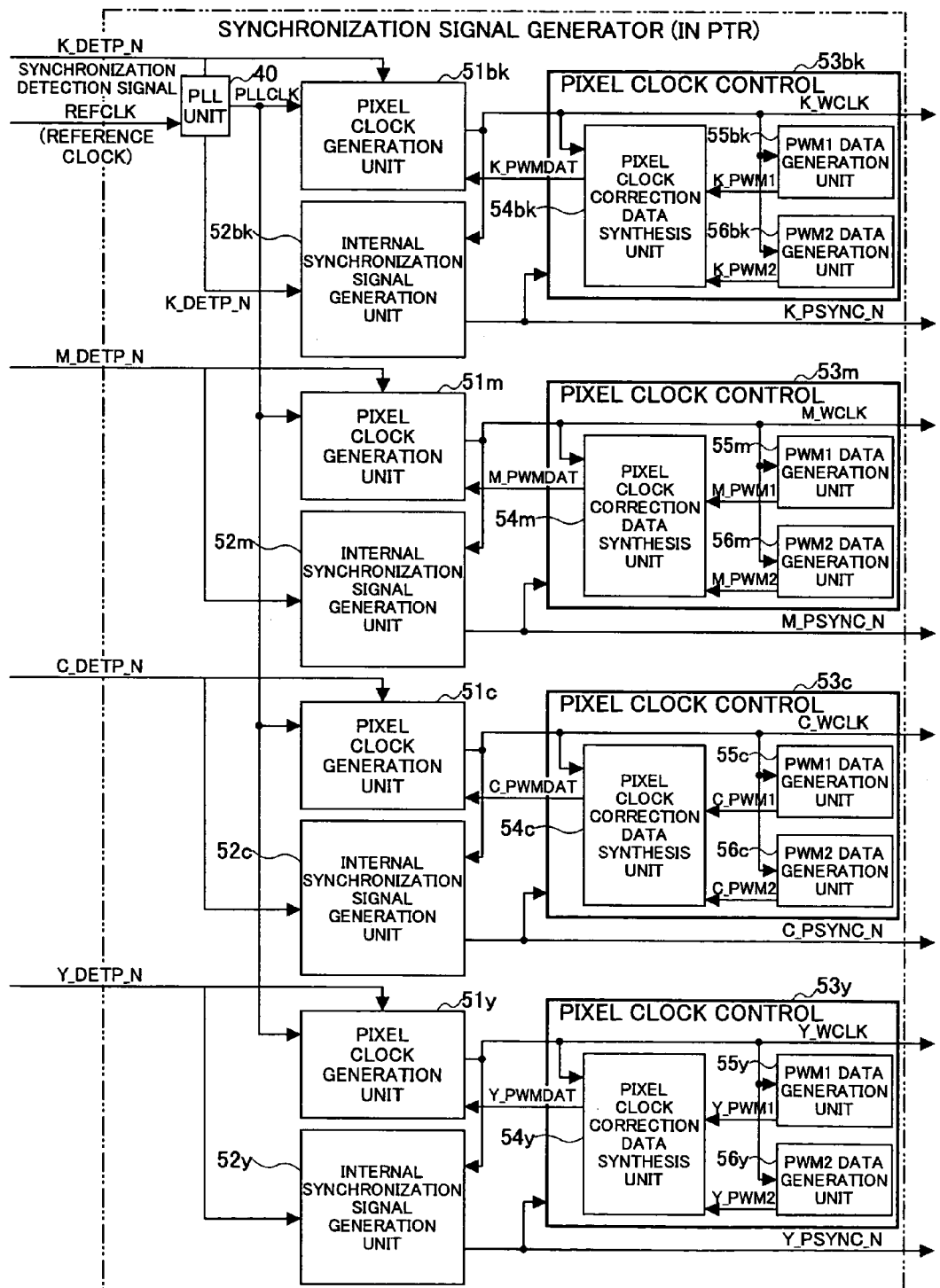
FIG. 6 is a block diagram of a synchronization signal generator.

FIG. 6 is a block diagram of a synchronization signal generator 135. The synchronization signal generator 135 generates a pixel synchronization clock *_WCLK and a line synchronization signal *_PSYNCN used for switching of the image signal which modulates the light beams in the LD units 31$bk$, 31$c$, 31$m$ and 31$y$ of the exposure device 5. The synchronization signal generator 135 is provided on an exposure control board (not shown in the figure) of the image forming unit PTR shown in FIG. 5.

Figure 3:
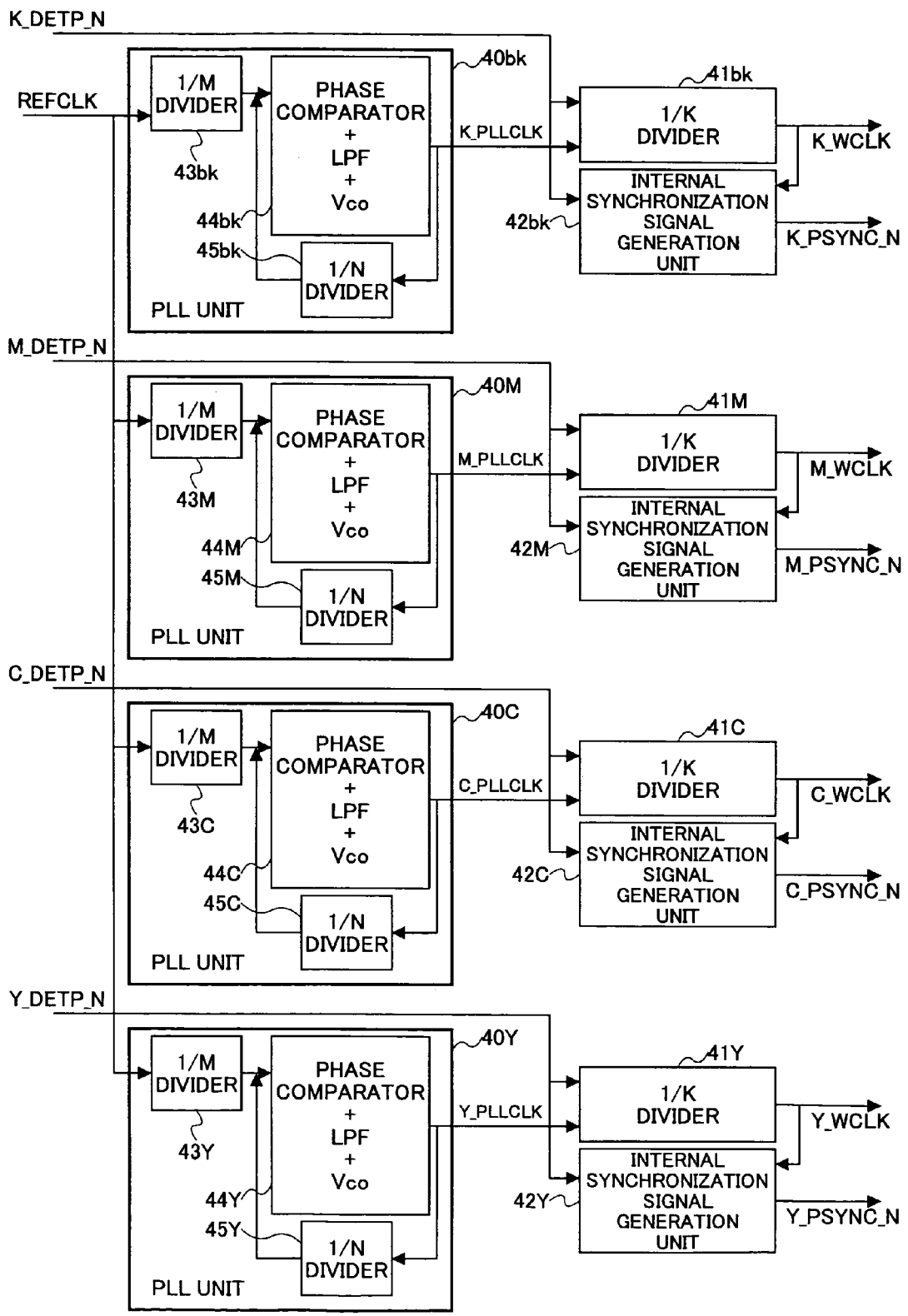
FIG. 3 is a block diagram of a conventional synchronization signal generator.

In FIG. 6, the synchronization signal generator 135 has one commonly used PLL unit 40, which has a structure the same as the conventional one shown in FIG. 3 (for example, 40$bk$).

Figure 8:
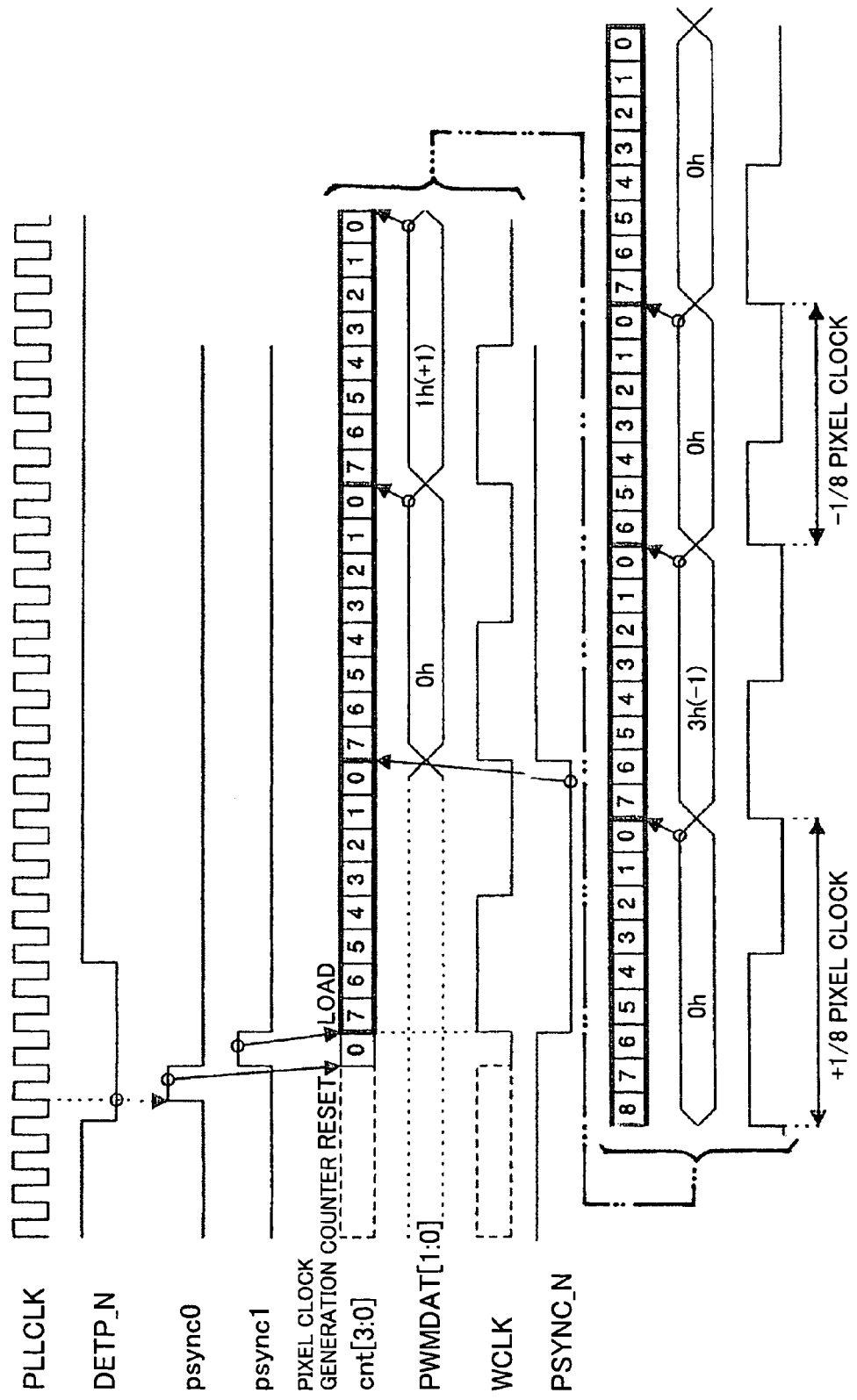
FIG. 8 is a time chart showing a transition of an input to a pixel clock generation unit and an output pixel clock.

A pixel clock generation unit 51$bk$ for K (bk) divides the high-frequency clock PLLCLK from the PLL unit 40 so as to generate the pixel clock K_WCLK by selectively outputting one of pulses of a period of a reference frequency, a period shorter than the reference frequency period and a period longer than the reference frequency period in accordance with an input selection data K_PWMDAT. Namely, the pixel clock generation unit 51$bk$ comprises (although not shown in the figure): a pixel clock generation counter (preset down-counter), which down-counts the high-frequency clock, PLLCLK; a latch for retaining the selection data K_PWMDAT given by the pixel clock control 53$bk$; an encoder, which generates data representing a numerical value 7 when the data K_PWMDAT is "Oh" (0 of decimal numeration), data representing a numerical value 8 when the data K_PWMDAT is "1h" (1 of decimal numeration), and data representing a numerical value 6 when the data K_PWMDAT is "3h", and supplies the generated data as load data to the pixel clock generation counter; and a count control circuit, which loads the numerical values output from the encoder to the pixel clock generation counter in synchronization with the high-frequency clock PLLCLK received after the count data of the pixel clock generation counter turns to a numerical value 0, and sets the pixel clock K_WCLK (a signal line outputting the pixel clock K_WCLK) to a high level H, and sets the pixel clock K_WCLK to a low level L when the count data (remaining value data) decremented by 1 each time one pulse of the high-frequency clock PLLCLK is received after the numerical value (7, 8 or 6) loaded to the pixel clock generation counter. Accordingly, the count data of the pixel clock generation counter changes from 7 to 0, 8 to 0 or 6 to 0, as shown in FIG. 8, in accordance with the selection data K_PWMDAT, and, thereby, the pixel clock K_WCLK, which is generated by dividing the frequency of the high-frequency clock PLLCLK by 8, 9 or 7, is output from the pixel clock generation unit 51bk. The pulse divided by 8 is referred to as a 0-dot pulse, the pulse divided by 9 is referred to as a −⅛-dot pulse and the pulse divided by 7 is referred to as +⅛-dot pulse. The period of the −⅛-dot pulse is shorter than the period of the 0-dot pulse by one period of the high-frequency clock PLLCLK, and the period of the +⅛-dot pulse is longer than the period of the 0-dot pulse by one period of the high-frequency clock PLLCLK FIG. 8 is a time chart showing a relationship between the inputs PLLCLK and K_PWMDAT of the pixel clock generation unit 51bk, the values indicated by the count data of the pixel clock generation counter and the output WCLK. As an example, the pixel clock generation unit 51bk selectively outputs an 8-divided pulse as the pixel clock K_WCLK when the selection data K_PWMDAT [1:0] is "0h", a 9-divided pulse 8 when K_PWMDAT is "1h", a 7-divided pulse 9 when K_PWMDAT is "3h". Since the image signal used for laser modulation for K (bk) image forming is finally switched in synchronization with the pixel clock K_WCLK, a pixel to which "1h" is supplied is lengthened by ⅛ pixel clock (one period of PLLCLK) and a pixel to which "3h" is supplied is shortened by ⅛ pixel clock (one period of PLLCLK).

Now, referring to FIG. 6 again, the internal synchronization signal generation unit 52bk generates a main-scanning synchronization detection signal, i.e., the line synchronization signal K_PSYNC_N, which synchronizes with the pixel clock K_WCLK on the basis of an end detection signal of the synchronization detection signal K_DETP_N of the synchronization sensors 38bkc and 40bkc.

A pixel clock control 53bk comprises: a PWM1-data generation unit 55bk, which generates the a main-scanning magnification correction data PWM1 for correcting a magnification error correction of a whole one line; a PWM2-data generation unit 56bk, which generates pixel-width scale correction data PWM2 for correcting partial scaling distortion in one line due to characteristics of the optical system; and a pixel clock correction data synthesis unit 54bk, which generates final correction data, that is, the selection data K_PWMDAT by synthesizing the above-mentioned sets of correction data.

Figure 7:
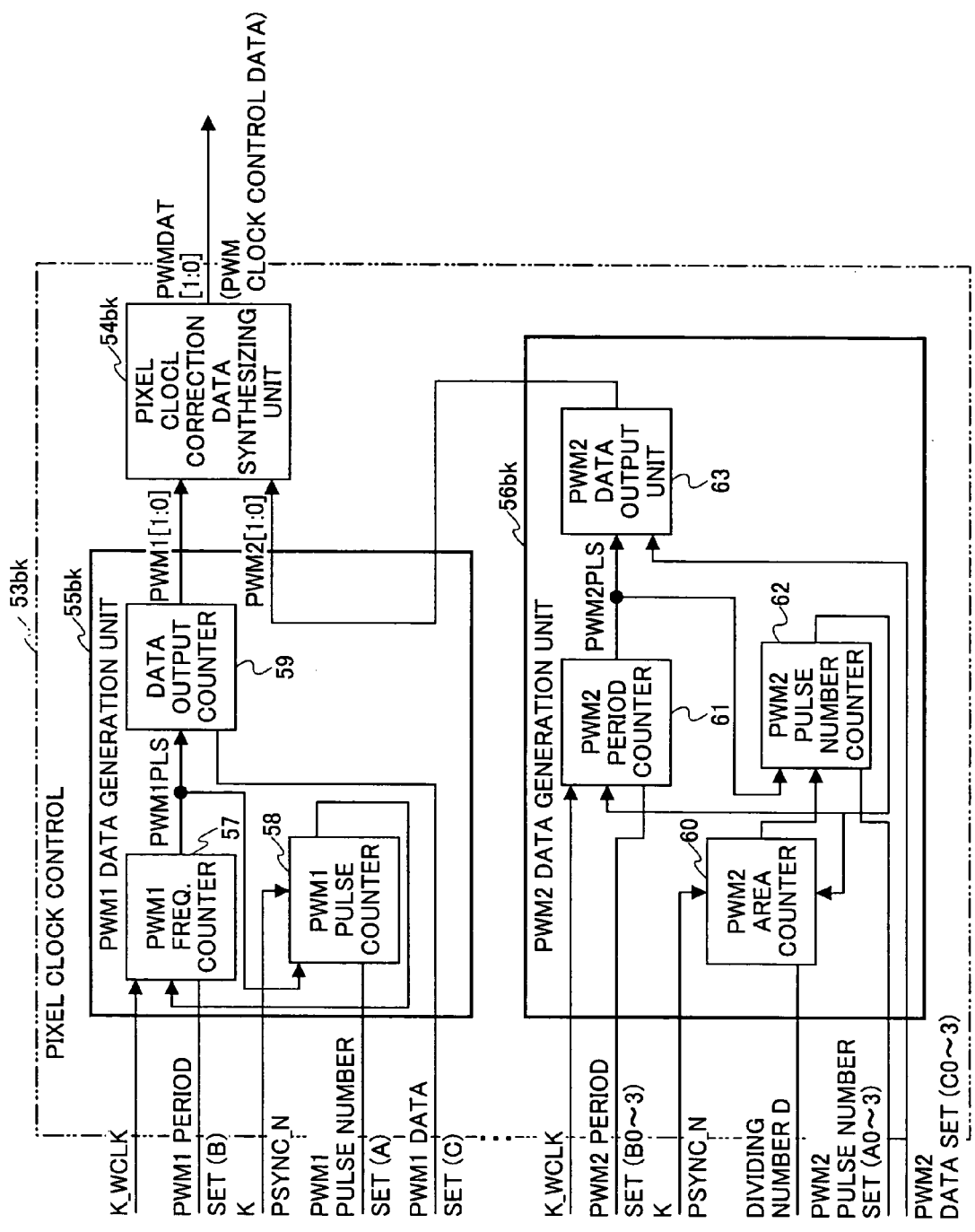
FIG. 7 is a block diagram showing a structure of a pixel clock control.
Figure 9:
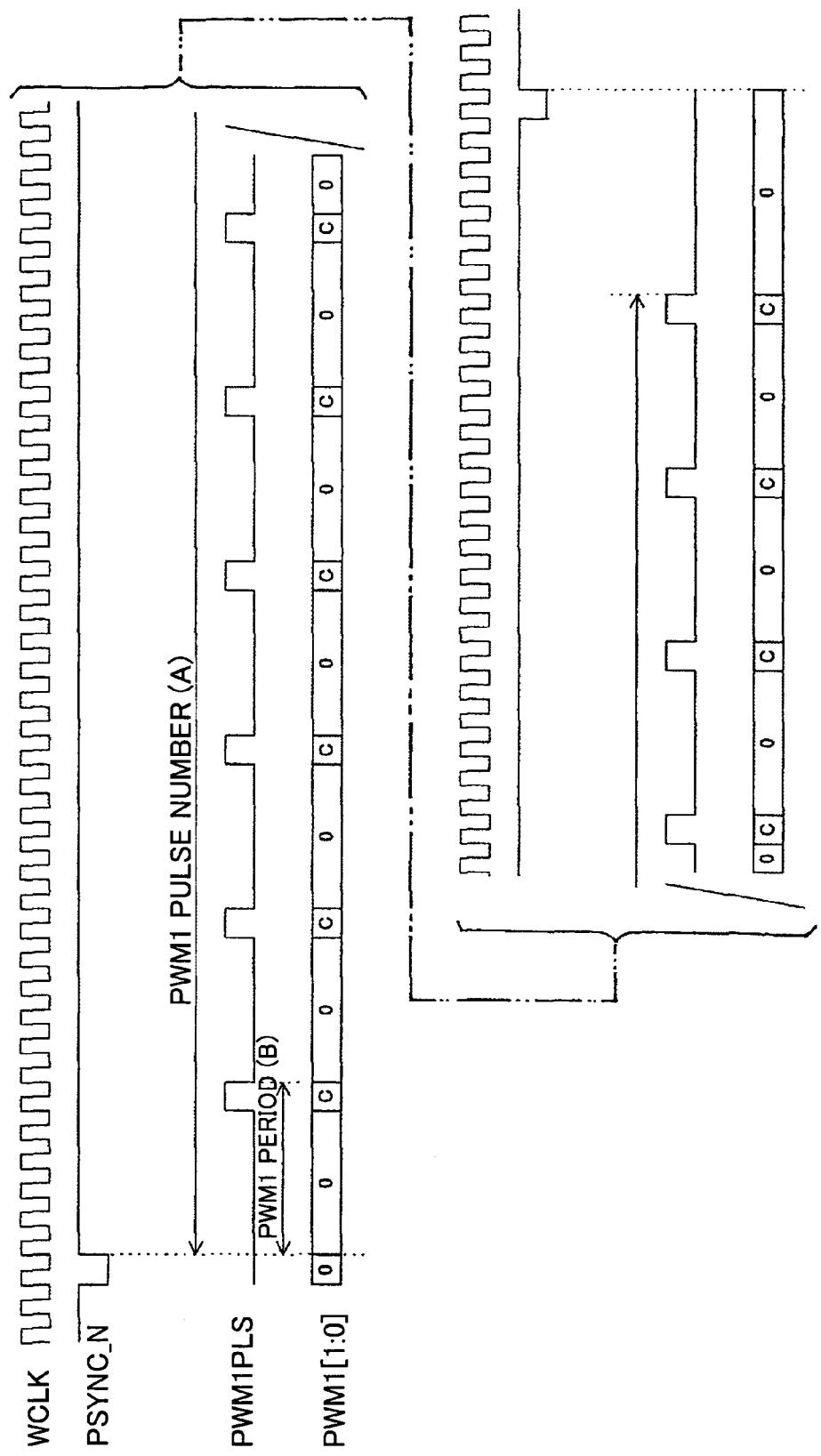
FIG. 9 is a time chart showing a transition of a first selection signal generated by a PWM1 data generation unit shown in FIG. 7.
Figure 10:
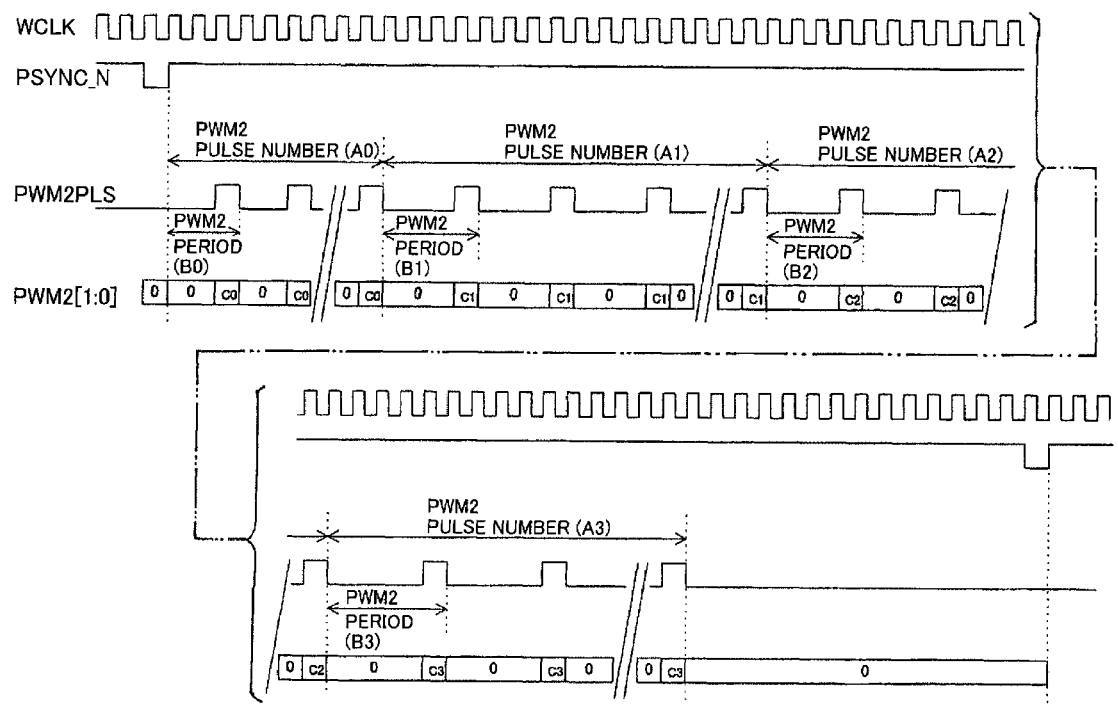
FIG. 10 is a time chart showing a transition of a second selection signal generated by a PWM2 data generation unit shown in FIG. 7.
Figure 11:
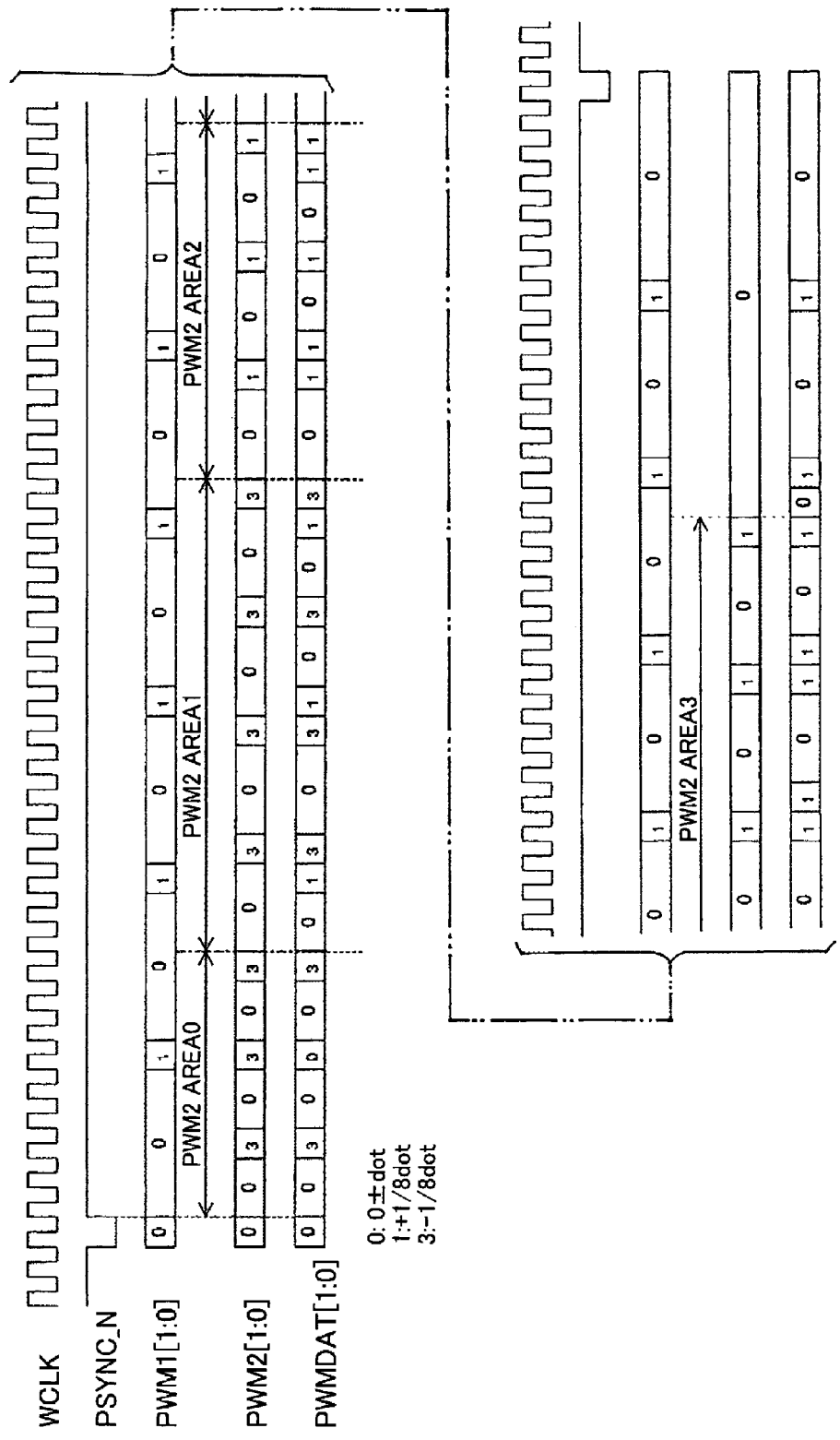
FIG. 11 is a time chart showing a transition of input data of a correction data synthesis unit and synthesized output data.

FIG. 7 is a block diagram showing the structure of the pixel clock control 53bk. FIG. 9 is a time chart showing a transition of the main-scanning magnification correction data PWM1, which is generated by the PWM1 data generation unit 55bk and are given to the correction data composition unit 54bk. FIG. 10 is a time chart showing a transition of the pixel-width scaling correction data PWM2, which is generated by the PWM2 data generation unit 56bk and given to the correction data synthesis unit 54bk. FIG. 11 is a time chart showing a transition of the input data PWM1 and PWM2 of the correction data synthesis unit 54bk and the synthesized output data K_PWMDAT.

Referring to FIG. 7 and FIG. 9, in a process of initialization performed by the process controller 131 immediately after the printer 100 (refer to FIG. 5) is turned on, the PWM setting data registered in the non-volatile memory 133b (refer to FIG. 5) is set (written in, retained and set) to a latch (not shown in the figure) of the PWM1-data generation unit 55bk. The PWM1 data contains a distribution period B and data C. The distribution period B is a distribution period of pixels (short period pulse assigned pixel or long period pulse assigned pixel), which do not have the reference period and are dispersed on one line to adjust an actual length of the line. The data C is for designating a number A of the reference periods B on one line and a period (short period pulse or long period pulse) of the pixels that do not have the reference period B. A×B represents a number of pixels (a number of K_WCLK), i.e., a number of pixels which determines the main-scanning magnification, and an entire length thereof can be adjusted according to the distribution period B ×(a deviation of the period designated by the data C with respect to the reference period=one period of PLLCLK). The deviation concerned=one period of PLLCLK is a positive value (long period pulse) or a negative value (short period pulse).

If the internal synchronization detection signal K_PSYNC_N is input, the PWM1 pulse number counter 58 loads the number A of the periods so as to start count down of a period count over signal PWM1PLS, and supplies a count permission signal to the PWM1 period counter 57. Thereby, the PWM1 period counter 57 loads the reference period B and starts the count down of the pixel clock K_WCLK. After counting down to the distribution period B, the PWM1 period counter 57 loads again the distribution period B so as to perform a circulation count in which the count down of the pixel clock K_WCLK is repeated. If the count data of the PWM1 period counter 57 becomes 1 (remaining value 1), a signal PWM1PLS (=H) representing the fact is generated. While the signal PWMLPLS is high, the PWM1 data output unit 59 outputs the data C (1 or 3) to the correction data synthesis unit 54bk as the main-scanning magnification correction data PWM1. While the signal PWM1PLS is low (PWM1PLS=L), the PWM1 data output unit 59 outputs data 0, which designates the pulse of the reference period, to the correction data synthesis unit 54bk as the main-scanning magnification correction data PWM1.

The PWM1 pulse number counter 58 will down-counts the above-mentioned signal PWMLPLS (=H) from the number A of periods, and cancels the count permission signal given to the PWM1 period counter 57 when the count value becomes equal to 0. That is, it is switched to a count prohibition level. Thereby, while A×B pixel clocks K_WCLK are being received, the PWM1PS pulse is generated. Then, only in one period of the pixel clock K_WCLK within the reference period B, the main-scanning magnification correction data PWM1 is switched from the data 0, which designates the reference period pulse (0dot), to the data C (1 or 3), which designates the long period pulse (+⅛ dot) or the short period pulse (−⅛ dot) (refer to FIG. 9).

In the present embodiment, as mentioned above, the number of pixels on one line is determined based on A×B, and the length of one line of pixels is adjusted based on A, B and C. A reference length of the one line of pixels is "reference period× A×B×main-scanning rate". Supposing that the difference (one period of PLLCLK) between the reference period and the long period or the short period designated by the data C is dPw, an increased or decreased length due to the adjustment with respect to the reference length corresponds to "dPw×(A/B)×main-scanning rate".

Referring to FIG. 7 and FIG. 10, in a process of initialization performed by the process controller 131 immediately after the printer (refer to FIG. 5) is turned on, the PWM2 setting data registered in the non-volatile memory 133b (refer to FIG. 5) is set to a shift register type latch (not shown in the figure) having a multi-stage structure in the PWM2 data generation unit 56*bk*. The PWM2 setting data includes, when, for example, dividing one line into four sections, a dividing number D of one line (=4), a first section length A0, a second section length A1, a third section length A2, a fourth section length A3, a first distribution period B0, a second distribution period B1, a third distribution period B2, a fourth distribution period B3, a first pixel period C0, a second pixel period C1, a third pixel period C2, and a fourth pixel period C0.

If the internal synchronization detection signal K_PSYNC_N is input, the PWM2 area counter 60 loads the dividing number D, and starts a count of the sections so as to supply the count data D=4 to a PWM2 pulse number counter 62. Thereby, the PWM2 pulse number counter 62 loads the first section length A0 related to given count data (4) to a latch, and starts a count down of a period count over signal PWM2PLS. Moreover, the PWM2 pulse number counter 62 supplies a count permission signal to the PWM2 period counter 61. Thereby, the PWM2 period counter 61 loads the first distribution period B0, and performs a count down of the pixel clock K_WCLK. After counting down to the distribution period B0, the PWM2 period counter 61 again loads the distribution period B0, and performs a circulation count in which the count down of the pixel clock K_WCLK is repeated. If the count data of the PWM1 period counter 61 becomes equal to 1 (remaining value 1), a signal PWM2PLS (=H) representing that condition is generated. While the signal PWM2PLS is high, the PWM2 data output unit 63 outputs the first pixel period C0 to the correction data synthesis unit 54*bk* as the pixel-width scaling correction data PWM2. While the signal PWM2PLS is low (PWM2PLS=L), the PWM2 data output unit 63 outputs the data 0, which designates the reference period, to the correction data synthesis unit 54*bk* as the pixel-width scaling correction data.

The PWM2 pulse number counter 62 down-counts from the number of periods A0 at which the signal PW2PLS (=H) is loaded, and supplies a carry signal to a PWM2 area counter 60 when the count value becomes equal to 0. Thereby, the count data of the PWM2 area counter 60 is switched to D-1 (=3). In response to this, the PWM2 number counter 62 of PWM2 loads the second section length A1 at this time, and supplies the count permission signal again to the PWM2 period counter 61. In response to the count permission signal, the PWM2 period counter 61 loads the second distribution period B1 so as to count down the pixel clock K_WCLK to the distribution period B1, and performs a circulation count in which the count down of the pixel clock K_WCLK to the distribution period B1 is repeated. If the count data of the PWM2 period counter 61 becomes equal to 1 (remaining value 1), the PWM2 period counter 61 generates a signal PWM2PLS (=H) representing the count data. While the signal PWM2PLS is high, a PWM2 data output unit 63 outputs the second pixel period C1 to the correction data synthesis unit 54*bk* as the pixel-width scaling correction data PWM2. While the signal PWM2PLS is low, the PWM2 data output unit 63 outputs the data 0, which designates the reference clock, to-the correction data synthesis unit 54*bk* as the pixel-width scaling correction data PWM2.

The PWM2 pulse number counter 62 down-counts from the number of periods A1 at which the signal PW2PLS (=H) is loaded, and supplies a carry signal to a PWM2 area counter 60 when the count value becomes equal to 0. Thereby, the count data of the PWM2 area counter 60 is switched to D-2 (=2). In response to this, the PWM2 number counter 62 of PWM2 loads the third section length A2 at this time, and supplies the count permission signal again to the PWM2 period counter 61. In response to the count permission signal, the PWM2 period counter 61 loads the third distribution period B2 so as to count down the pixel clock K_WCLK to the distribution period B2, and performs a circulation count in which the count down of the pixel clock K_WCLK to the distribution period B2 is repeated. If the count data of the PWM2 period counter 61 becomes equal to 1 (remaining value 1), the PWM2 period counter 61 generates a signal PWM2PLS (=H) representing the count data. While the signal PWM2PLS is high, the PWM2 data output unit 63 outputs the third pixel period C2 to the correction data synthesis unit 54*bk* as the pixel-width scaling correction data PWM2. While the signal PWM2PLS is low, the PWM2 data output unit 63 outputs the data 0, which designates the reference clock, to the correction data synthesis unit 54*bk* as the pixel-width scaling correction data PWM2.

The PWM2 pulse number counter 62 down-counts from the number of periods A2 at which the signal PW2PLS (=H) is loaded, and supplies a carry signal to a PWM2 area counter 60 when the count value becomes equal to 0. Thereby, the count data of the PWM2 area counter 60 is switched to D-3 (=1). In response to this, the PWM2 number counter 62 of PWM2 loads the fourth section length A3 at this time, and supplies the count permission signal again to the PWM2 period counter 61. In response to the count permission signal, the PWM2 period counter 61 loads the fourth distribution period B3 so as to count down the pixel clock K_WCLK to the distribution period B3, and performs a circulation count in which the count down of the pixel clock K_WCLK to the distribution period B3 is repeated. If the count data of the PWM2 period counter 61 becomes equal to 1 (remaining value 1), the PWM2 period counter 61 generates a signal PWM2PLS (=H) representing the count data. While the signal PWM2PLS is high, the PWM2 data output unit 63 outputs the fourth pixel period C3 to the correction data synthesis unit 54*bk* as the pixel-width scaling correction data PWM2. While the signal PWM2PLS is low, the PWM2 data output unit 63 outputs the data 0, which designates the reference clock, to the correction data synthesis unit 54*bk* as the pixel-width scaling correction data PWM2.

The PWM2 pulse number counter 62 down-counts from the number of periods A3 at which the signal PW2PLS (=H) is loaded, and supplies a carry signal to a PWM2 area counter 60 when the count value becomes equal to 0. Thereby, the count data of the PWM2 area counter 60 is switched to D-4 (=0). The count data (0) corresponds to a count non-permission signal. In response to the count data (0), the PWM2 pulse number counter 62 stops the counting operation, and the count operation of the PWM2 period counter 61 is also stopped.

According to the above-mentioned operations, in the first section during-which A0×B0 pulses of the pixel clock K_WCLK are received, as shown in FIG. 10, the pixel-width scaling correction data PWM2 is switched from the data 0, which designates the reference period pulse, to the data C0, which designates the long period pulse or the short period pulse at the period B0 within only one period of the pixel clock K_WCLK. In the next second section during which A1×B1 pulses of the pixel clock K_WCLK are received, as shown in FIG. 10, the pixel-width scaling correction data PWM2 is switched from the data 0, which designates the reference period pulse, to the data C1, which designates the long period pulse or the short period pulse at the period B1 within only one period of the pixel clock K_WCLK. In the next third section during which A2×B2 pulses of the pixel clock K_WCLK are received, as shown in FIG. 10, the pixel-width scaling correction data PWM2 is switched from the data 0, which designates the reference period pulse, to the data C2, which designates the long period pulse or the short period pulse at the period B2 within only one period of the pixel clock K_WCLK. In the final fourth section during which A3×B3 pulses of the pixel clock K_WCLK are received, as shown in FIG. 10, the pixel-width scaling correction data PWM2 is switched from the data 0, which designates the reference period pulse, to the data C3, which designates the long period pulse or the short period pulse at the period B3 within only one period of the pixel clock K_WCLK.

Referring to FIG. 7 and FIG. 11, the pixel clock correction data synthesis unit 54bk generates final correction data, that is, the selection data PWMDAT[1:0] by synthesizing the main-scanning magnification correction data PWM1 and the pixel-width scaling correction data PWM2, and outputs the generated selection data to the pixel clock generation unit 51bk. The correction data synthesis unit 54bk synthesizes the sets of data according to an addition PWMDAT[1:0]=PWM1+PWM2. That is, if the sets of data PWM1, PWM2 and PWMDAT[1:0] are set as 0h, 4h: ±0 dot, 1h: +⅛ dot, 3h: −⅛ dot when the result of addition of the two sets of correction data becomes equal to ±⅔ dot, the result is divided and output to a following pixel so that a correction corresponding to more than ±⅔ dot is not applied to a single pixel. Specifically, the sets of data PWM1, PWM2 and PWMDAT[1:0] are set as follows:

data designating the reference period pulse (8-divided high-frequency clock PLLCLK) : a numerical value 0 (a pixel to which the data is assigned is expressed as ±0 dot in FIG. 10);

data designating the long period pulse (7-divided high-frequency clock PLLCLK): a numerical value 1 (a pixel to which the data is assigned is expressed as +⅛ dot in FIG. 10); and data designating the short period pulse (9-divided high-frequency PLLCLK): a numerical value 3 (a pixel to which the data is assigned is expressed as −⅛ dot in FIG. 10).

When the result of addition is 4, the addition is 1+3 or 3+1, which correspond to (+⅛ dot)+(−⅛ dot)=0 dot, and, thus, the result is encoded into 0 (to dot). Moreover, since 2 is 1+1, which corresponds to (+⅛ dot)+(+⅛ dot)=+⅔ dot, it cannot be expressed by a single pixel, and, thus, the result is encoded into 1 and a reminder of 1 is carried over to a following pixel.

If the result of addition is 0, the result is left as 0 (±0 dot) as it is, and if the result of addition is 1, the result is left as 1 (+⅛ dot) as it is. Additionally, if the result of addition is 3, the result is left as 3 (−⅛ dot) as it is. Further, is the result of addition is 6, it cannot be expressed by a single pixel, and, thus, the result is set as 3 (−⅛ dot) and the remainder 3 is carried over to a following pixel.

Using the addition and encoding (data conversion), the pixel clock correction data synthesis unit 54bk generates the selection data PWMDAT[1:0] (3-bit data that is a combination of each bit 1-0), and outputs the selection data to the pixel clock generation unit 51bk shown in FIG. 6. As already mentioned, when PWMDAT[1:0] indicates a numerical value 0 (reference period pulse), the pixel clock generation unit 51bk outputs, in response to the selection data PWMDAT[1*0], the pixel clock K_WCLK that is obtained by 8-dividing the high-frequency clock PLLCLK (frequency is divided by 8), which is at a high level H during consecutive four periods of the high-frequency clock PLLCLK and at a low level L during the subsequent consecutive four periods, as shown in FIG. 8. When PWMDAT [1:0] indicates a numerical value 1 (long period pulse), the pixel clock generation unit 51bk outputs, in response to the selection data PWMDAT[1*0], the pixel clock K_WCLK that is obtained by 9-dividing the high-frequency clock PLLCLK (frequency is divided by 9), which is at the high level H during consecutive five periods of the high-frequency clock PLLCLK and at the low level L during the subsequent consecutive four periods. When PWMDAT [1:0] indicates a numerical value 3 (short period pulse), the pixel clock generation unit 51bk outputs., in response to the selection data PWMDAT[1*0], the pixel clock K_WCLK that is obtained by 7-dividing the high-frequency clock PLLCLK (frequency is divided by 7), which is at the high level H during consecutive three periods of the high-frequency clock PLLCLK and at the low level L during the subsequent consecutive four periods.

It should be noted that, since the selection data PWMDAT [1:0] is an addition value of the main-scanning magnification correction data PWM1 and the pixel-width scaling correction data PWM2, and since it is possible to generate a difference between the number of pixels on one line which is set according to the main-scanning magnification correction data PWM1 and the length of the pixel train depending on the setup (refer to FIG. 10) of the pixel-width scaling correction data PWM2, it is set as A×B=A0×B0+A1×B1+A2×B−2+ A3×B3. Moreover, C0-C3 on one line as a whole shall consist of the long period pulses and the short period pulses of the same number so that the length of the line is not increased or decreased due to the pixel-width scaling correction.

As shown in FIG. 6, the synchronization signal generator 135 includes: a combination (unit) of the pixel clock generation unit 51bk for generating the above-mentioned synchronization signal for K(bk) (the pixel clock K_WCLK and the line synchronization signal K_PSYNC_N), the internal synchronization signal generation unit 52bk, and the pixel clock control 53bk; 51m, 52m and 53m for M(m) of the same structure and function as 51bk, 52bk and 53bk, respectively; 51y, 52y and for 53m for C(c) of the same structure and function as 51bk, 52bk and 53bk, respectively; and 51y, 52y and 53y for Y(y) of the same structure and function as 51bk, 52bk and 53bk, respectively.

The above-mentioned PWM1 setting data (the distribution period B of the pulses (pixels), which do not have the reference period, dispersed and distributed on one line for adjusting an actual length of the line, and the data C for designating the number A of the period on one line and (periods of) pulses which do not have the reference period) can be registered in the non-volatile memory 133b (refer to FIG. 1) in the present embodiment, and can be automatically updated by the process controller 131. In the present embodiment, an operator can register the PWM1 setting data in the non-volatile memory 133b, and the process controller 131 can automatically update the PWM1 setting data.

The above-mentioned PWM2 setting data (when one line is divided into 4 sections, the number D of divided sections of one line (=4), the first section length A0, the second section length A1, the third section length A2, the fourth section length A3, the first distribution period B0, the second distribution period B1, the third distribution period B2, the first distribution period B3, the first pixel period C0, the second pixel period C1, the third pixel period C2, and the fourth pixel period C0) is registered in the non-volatile memory 133b by an operator in the present embodiment.

When the operator operates an initial setting key (not shown in the figure) provided in the input device 614 of the operation board 610, the CPU 617 displays an initial setting menu on the display device 615. When the operator selects the main-scanning magnification correction in the menu, the CPU 617 displays an input screen on the display device 615 for selecting one of manual setting of the main-scanning magnification correction, automatic setting of the main-scanning magnification correction on an individual print command basis and automatic setting of the main-scanning magnification correction on an individual print page basis. Then, if the operator selects the manual setting of the main-scanning magnification correction, the CPU 617 reads a PWM1 setting data table through the system controller 630 and the process controller 131, and displays on the display device 615 the PWM1 setting data (B, A and C) for K(bk), C(c), M(m) and Y(y) in the table. If the operator changes the setting data by a predetermined operation and operates an enter key on the screen, the CPU 617 updates the PWM1 setting data table by writing the PWM1 setting data displayed on the display device 615 in the PWM1 setting data table, and transfers the thus-updated PWM1 setting data table to the non-volatile memory 133b through the system controller 630 and the process controller 131 so as to update the table in the non-volatile memory 133b. Then, the selection of the manual setting of the main-scanning magnification correction is registered into the non-volatile memory 133b.

When the operator selects the automatic setting of the main-scanning magnification correction on an individual print command basis, the CPU 617 registers the selection in the non-volatile memory 133b through the system controller 630 and the process controller 131. When the operator selects the automatic setting of the main-scanning magnification correction on an individual print page basis, the CPU 617 registers the selection in the non-volatile memory 133b through the system controller 630 and the process controller 131.

If the operator selects a color offset correction in the initial setting menu, the CPU 617 displays a color offset menu on the display device 615. If the operator selects a pixel-width scaling correction in the menu, the CPU 617 reads a PWM2 setting data table from the non-volatile memory 133b through the system controller 630 and the process controller 131. Then, the CPU 617 displays on the display device 615 the PWM2 setting data (D, A0-A3, B0-B3, C0-C3) for K(bk), C(c), M(m) and Y(y). If the operator changes the setting data by a predetermined operation and operates an enter key on the screen, the CPU 617 updates the PWM2 setting data table by writing the PWM2 setting data displayed on the display device 615 in the PWM2 setting data table, and transfers the thus-updated PWM1 setting data table to the non-volatile memory 133b through the system controller 630 and the process controller 131 so as to update the table in the non-volatile memory 133b.

A description will now be given of an example of a determination mode of the PWM2 setting data used for a pixel-width scaling correction. Supposing that, for example, the total number of pixels of one line is 10,000 and the one line is divided into four sections in response to the characteristics of the optical system (D=4), and the main-scanning positions at 2,500 pixels (dots), 5,000 pixels (dots) and 7,500 pixels (dots) are greater that the ideal values by 75 μm, 85 μm and 75 μm, respectively.

If the pixel density is 6,000 dpi and a unit of correction of the pixel clock is ±⅛ dot, the pixel position can be shifted (increased or decreased) by about 5.29 μm by inserting a single pixel, which increases or decreases the length of the pixels by ⅛ dot in one area (section). Since the length of the pixels is increased by 75 μm with respect to the ideal value at the position of 2,500 pixels, a correction may be applied by −14/8 dots before reaching 2,500 pixels. The setting data of the area (section) 0 includes A0 (number of pulses)=14, B0 (period)=2,500/14=178 (A0×B0≦2,500), and C0 (correction data)=3.

Although a correction of −16/8 dots may be applied before reaching 5,000 pixels, a correction of −2/8 dots is applied to the area 1 since a correction of −14/8 dots has been made in the area 0. The setting data of the area 1 includes A1 (number of pulses)=2, B1 (period)=2,500/2=1,250 (A1×B1≦2,500), and C1 (correction data)=3.

Similarly, by correcting +2/8 dots in the area 2 and +14/8 dots in the area 3, a local magnification deviation correction can be made without changing the total magnification. The setting data becomes as follows: A2 (number of pulses)=2, B2 (period)=2,500/2=1,250 (A2×B2≦2,500), C2 (correction data) =1 A3 (number of pulses)=14, B3 (period)=2,500/14=178 (A3×B3≦2,500), and C3 (correction data)=1. The thus-obtained data D, A0-A3, B0-B3 and C0-C3 is registered in the PWM2 setting data table of the non-volatile memory 133b by using the above-mentioned initial setting.

Figure 12:
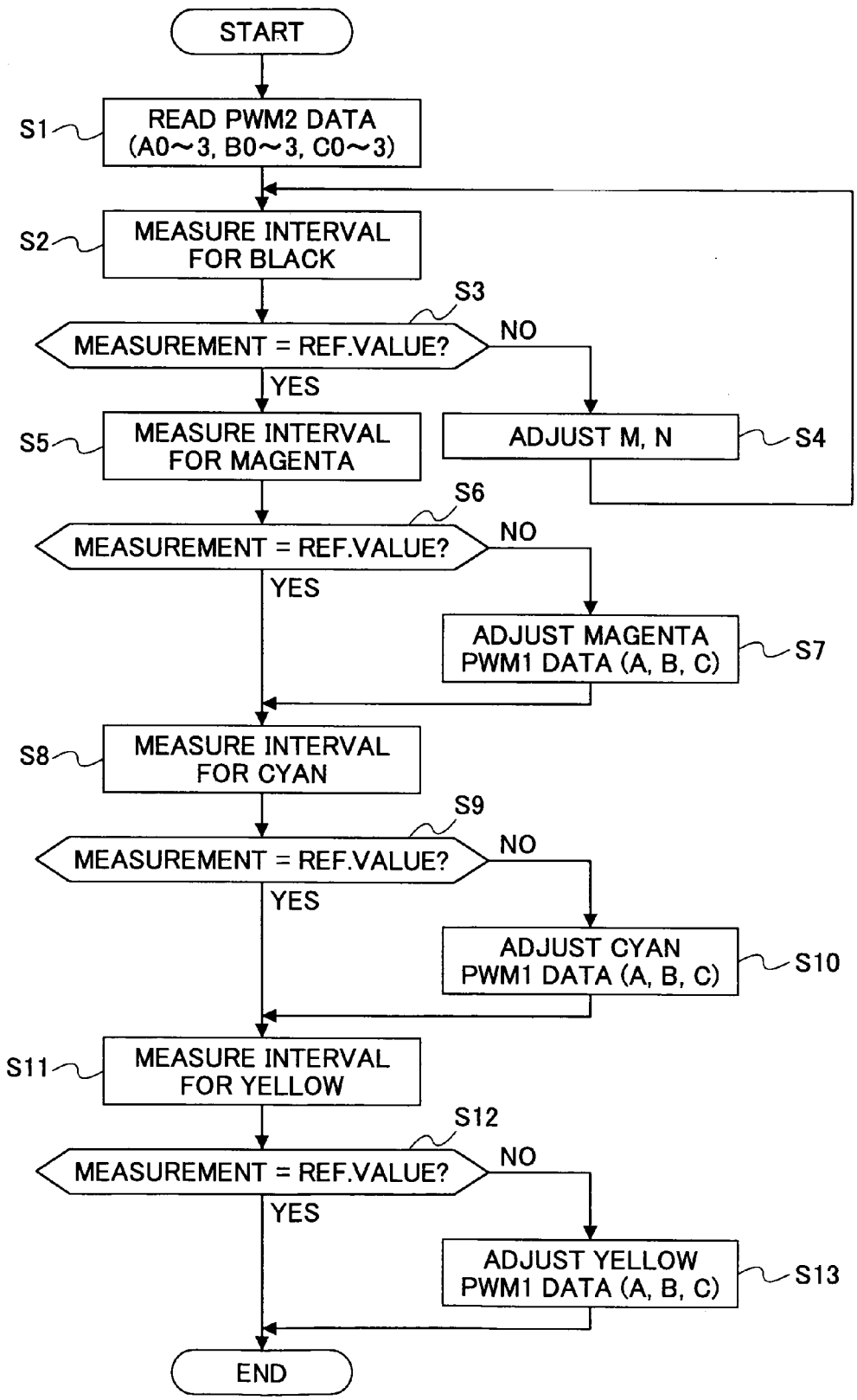
FIG. 12 is a flowchart of an example a main-scanning magnification correction performed by a process controller shown in FIG. 5.

FIG. 12 shows an outline of the main-scanning magnification correction performed by the process controller 131. When the main-scanning magnification correction on an individual print command basis is selected and registered by the above-mentioned initial setting, the process controller 131 performs the main-scanning magnification correction in response to a print command such as a copy start or a print start from the operation board 610, the PC or the FCU. First, the process controller 131 reads the data of the PWM2 setting data table of the non-volatile memory 133b, and saves (writes) the data in a register (an area of the RAM) (step S1).

Then, in a reference color, an interval between two synchronization detections is measured, that is, a time interval from a time when the start point sensors (38bk, 38ym) detect the light beam to a time when the end point sensors (40bkc, 40ym) detect the light beam is measured by counting the high-frequency clock PLLCLK. If black (K/bk) is set as the reference color, a main-scanning magnification error of black is adjusted by changing setting values of M and N of the PLL unit 40 so that the measurement value of black matches the reference value (steps S2-S4).

Similarly, the synchronization detection interval measurement is performed for other colors (magenta M, cyan C and yellow Y). If, for example, the measurement value of magenta M is greater than the reference value by four, this means that it is shorter than the reference by 4/8 pixels, and, thus, the magnification matches by increasing 4/8 pixels. Therefore, in this case, the data A=4 and C=1 is set for magenta M. The value of B is set to an appropriate interval when four +⅛-dots are inserted into one line according to the total number of pixels in the one line. For example, when the total number of pixels is 10,000, B is set to 2,500 (B=2,500) since +⅛-dot is inserted for each 2,500 pixels. Such a process is performed for cyan C and yellow Y (steps S5-S13).

The thus-obtained data for each color is registered in the PWM2 setting data table of the non-volatile memory 133b, and are latched by the PWM1 data generation units 55bk, 55m, 55c and 55y.

By performing a writing operation according to the setting data, an image having no color offset with matched magnification can be obtained.

Figure 13:
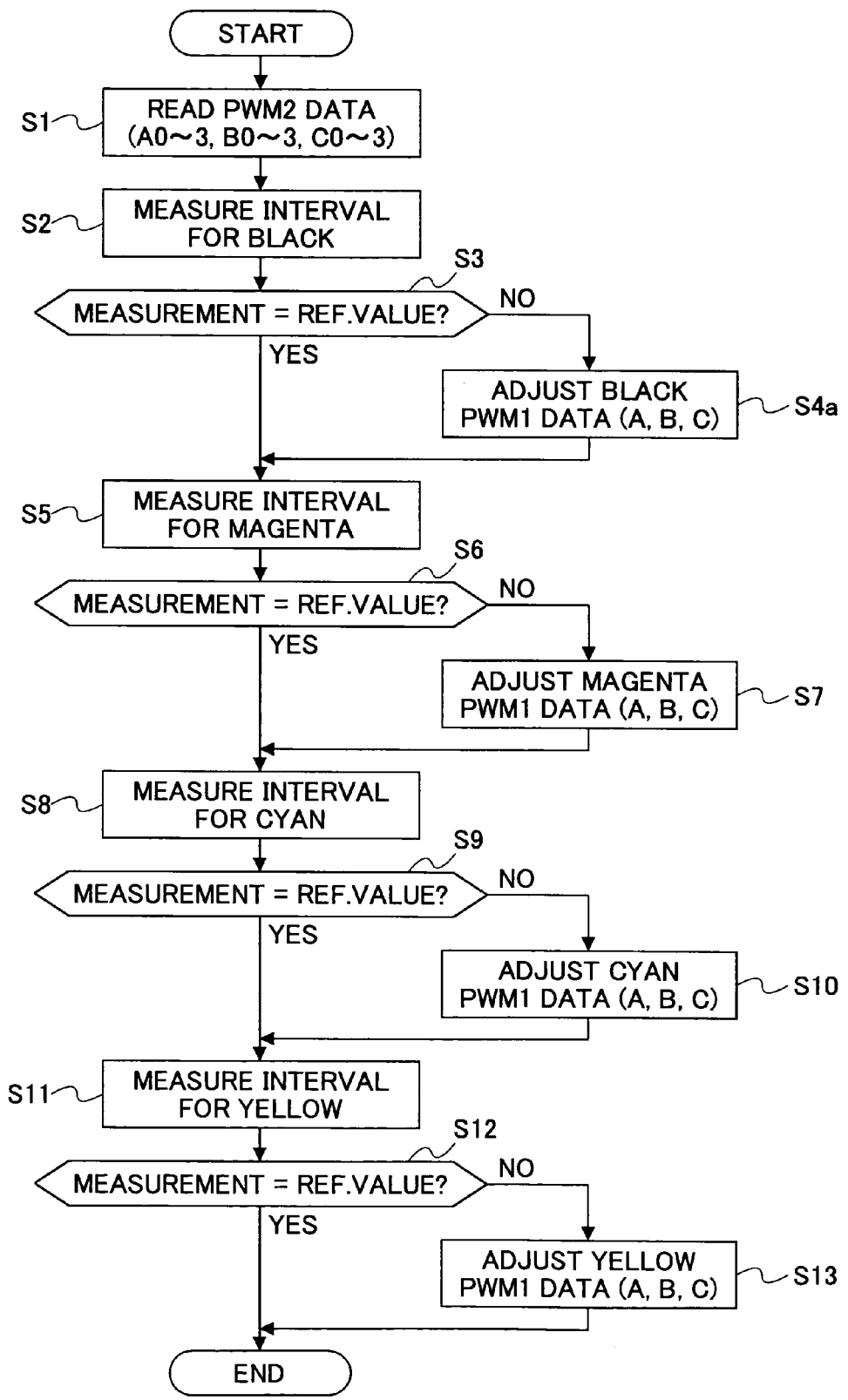
FIG. 13 is a flowchart of another example of the main-scanning magnification correction performed by the process controller shown in FIG. 5.
Figure 14:
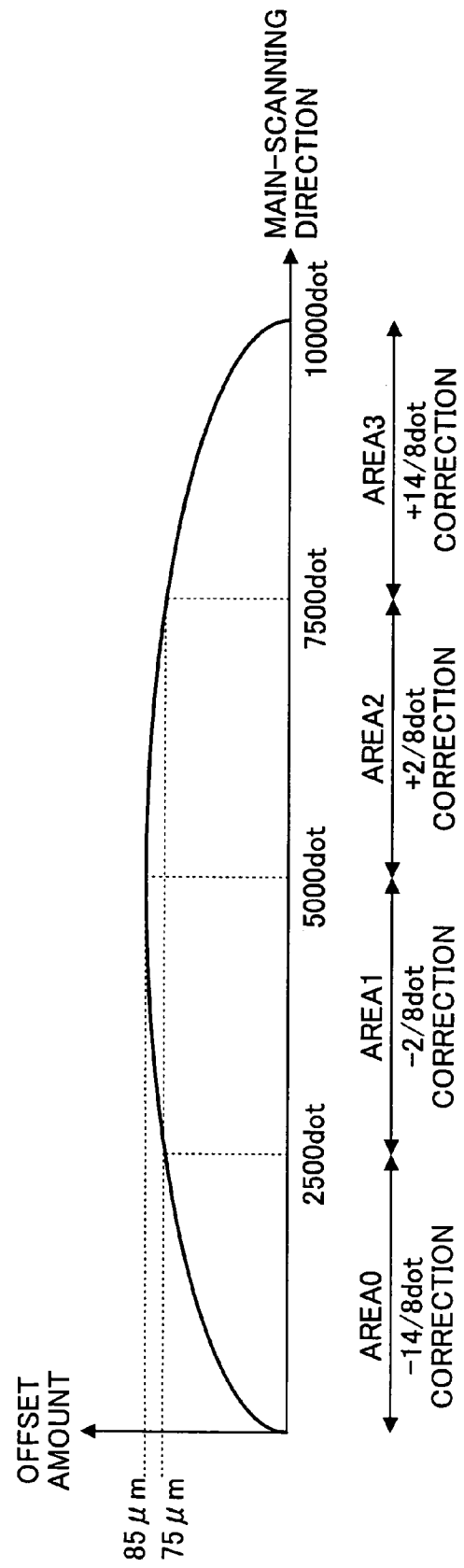
FIG. 14 is a graph showing a shift in a pixel-width on one main-scanning line due to a distortion of an exposure scanning optical system.

If the selection of the automatic setting of the main-scanning magnification correction on an individual print page basis is registered in the non-volatile memory 133b according to the above-mentioned initial setting, the process controller 131 performs the main-scanning magnification correction shown in FIG. 13 when a print command is received. Here, the data of the PWM2 setting data table of the non-volatile memory 133b is read first, and is saved (written) in a register (an area of the RAM) (step S1).

Then, an interval between two synchronization detections for black (K/bk) is measured, that is, a time interval from a time when the start point sensors (38bk, 38ym) detect the light beam to a time when the end point sensors (40bkc, 40ym) detect the light beam is measured by counting the high-frequency clock PLLCLK so as to adjust the PWM1 data (A, B, C) of black in response to a measurement value error with respect to the reference value (steps S2-S4). Such a process is performed for magenta M, cyan C and yellow Y (steps S5-S13). Then, the process of steps S3-S13 of FIG. 13 is performed before start printing each page subsequent to the second page.

When performing the main-scanning magnification correction between pages, a waiting time for starting an image formation between pages is elongated if the frequency of the PLL unit 40 is changed (steps A2-A4 of FIG. 12). Thus, when the selection of the automatic setting of the main-scanning magnification correction on an individual print page basis is made, the high-frequency clock PLLCLK (M, N) is not changed but the values of A, B and C for black (reference color) are adjusted similar to other colors. Thereby, a magnification correction can be performed without dropping productivity.

The present invention is not limited to the specifically disclosed embodiments, and variations and modifications may be made without departing from the scope of the present invention.

The present application is based on Japanese priority application No. 2003-30109 filed Feb. 6, 2003, the entire contents of which are hereby incorporated by reference.

What is claimed is:

1. A synchronization signal generator comprising:
 a phase locked loop unit that generates a high-frequency clock signal based on a reference clock signal and a synchronization detection signal; and
 a plurality of pixel clock generators each of which generates a pixel clock signal based on the high-frequency clock signal and the synchronization detection signal, wherein each of the pixel clock generators includes:
 a pixel clock generation unit that divides a frequency of said high-frequency clock signal so as to generate one or more first pulses of a reference period, one or more second pulses of a long period longer than the reference period and one or more third pulses of a short period shorter than the reference period, and said pixel clock generation unit outputting, as the pixel clock signal, one of the first, second and third pulses that is designated by an output selection signal;
 a first data generation unit that outputs a first selection signal selectively designating one of the first, second and third pulses, in synchronization with said pixel clock signal, in accordance with a time-series distribution of the first second and third pulses of each period defined by a first set of data;
 a second data generation unit that outputs a second selection signal selectively designating one of the first, second and third pulses, in synchronization with said pixel clock signal, in accordance with a time-series distribution of the first, second and third pulses of each period defined by a second set of data; and
 a synthesizing unit that synthesizes the first selection signal and the second selection signal so as to generate said output selection signal and outputs said output selection signal to said pixel clock generation unit.

2. A synchronization signal generator comprising:
 a phase locked loop unit that generates a high-frequency clock signal; and
 a pixel clock generator that generates a pixel clock signal based on the high-frequency clock signal and a synchronization detection signal,
 wherein the pixel clock generator includes:
 a pixel clock generation unit that divides a frequency of said high-frequency clock signal so as to generate one or more first pulses of a reference period, one or more second pulses of a long period longer than the reference period and one or more third pulses of a short period shorter than the reference period, and said pixel clock generation unit outputting, as the pixel clock signal one of the pulses that is designated by output selection data;
 a first data generation unit that outputs a first selection data selectively designating one of the first, second and third pulses, in synchronization with said pixel clock signal, in accordance with a time-series distribution of the first, second and third pulses of each period defined by a first set of data;
 a second data generation unit that outputs second selection data selectively designating one of the first, second and third pulses, in synchronization with said pixel clock signal, in accordance with a time-series distribution of the first, second and third pulses of each period defined by a second set of data; and
 a synthesizing unit that adds the first selection data and the second selection data so as to generate said output selection data and output said output selection data to said pixel clock generation unit.

3. The synchronization signal generator as claimed in claim 2, wherein
 values of the output selection data designating the reference period, the long period and the short period are equal to numerical values a, b and c, respectively, and
 said synthesizing unit sets the output selection data to the value a when a result of addition is a×2 or b+c, and to the value a when a result of addition is a+b, and
 said synchronization unit sets the output selection data to the value b when a result of addition is b×2, and
 said synchronization unit sets the output selection data to the value c when a result of addition is c×2.

4. The synchronization signal generator as claimed in claim 3, wherein the values a, b and c are set to 0, 1 and 3, respectively.

5. The synchronization signal generator as claimed in claim 2, wherein a plurality of said pixel clock generators are provided each of which shares said single phase locked loop unit.

6. A synchronization signal generator comprising:
 a phase locked loop unit that generates a high-frequency clock signal; and
 a pixel clock generator including:
 a pixel clock generation unit that divides a frequency of said high-frequency clock signal so as to generate one or more first pulses of a reference period, one or more second pulses of a long period longer than the reference period and one or more third pulses of a short period shorter than the reference period, and said pixel clock generation unit outputting, as a pixel clock signal, one of the pulses that is designated by output selection data;
 a first data generation unit that outputs first selection data selectively designating one of the first, second and third pulses, in synchronization with said pixel clock signal, in accordance with a time-series distribution of the first, second and third pulses of each period defined by a first set of data;
 a second data generation unit that outputs second selection data selectively designating one of the first, second and third pulses, in synchronization with said pixel clock signal, in accordance with a time-series distribution of the first, second and third pulses of each period defined by a second set of data; and a synthesizing unit that synthesizes the first selection data and the second selection data so as to generate said output selection data, wherein values of the data designating the pulses of the reference period, the Long period longer than the reference period and the short period shorter than the reference period are set to numerical values a, b and c, respectively, and wherein said synthesizing unit sets the output selection data to the value a when both the first selection data and the second selection data are equal to a, and sets the output selection data to the value b when one of the first selection data and the second selection data is equal to a and the other is equal to b;

said synthesizing unit sets the output selection data to the value b when both the first selection data and the second selection data are equal to b, and sets the output selection data to the value a when one of the first selection data and the second selection data is equal to b and the other is equal to c; and said synthesizing unit sets the output selection data to the value c when both the first selection data and the second selection data are equal to c.

7. The synchronization signal generator as claimed in claim 6, wherein the values a, b and c are set to 0, 1 and 3, respectively.

8. The synchronization signal generator as claimed in claim 6, wherein a plurality of said pixel clock generators are provided each of which shares said single phase locked loop unit.

9. A synchronization signal generator comprising:

high-frequency clock generating means for generating a high-frequency clock signal based on a reference clock signal and a synchronization detection signal; and a plurality of pixel clock generators each of which generates a pixel clock signal based on the high-frequency clock signal and the synchronization detection signal, wherein each of the pixel clock generators includes:

pixel clock generating means for dividing a frequency of said high-frequency clock signal so as to generate one or more first pulses of a reference period, one or more second pulses of a long period longer than the reference period and one or more third pulses of a short period shorter than the reference period, and said pixel clock generating means outputting, as the pixel clock signal, one of the first, second and third pulses that is designated by an output selection signal;

first selection means for outputting a first selection signal selectively designating one of the first, second and third pulses, in synchronization with said pixel clock signal, in accordance with a time-series distribution of the first, second and third pulses of each period defined by a first set of data;

second selection means for outputting a second selection signal selectively designating one of the first, second and third pulses, in synchronization with said pixel clock signal, in accordance with a tine-series distribution of the first, second and third pulses of each period defined by a second set of data; and synthesizing means for synthesizing the first selection signal and the second selection signal so as to generate said output selection signal and output said output selection signal to said pixel clock generating means.

10. A synchronization signal generator comprising:

high-frequency clock generating means for generating a high-frequency clock signal; and a pixel clock generator char generates a pixel clock signal based on the high-frequency clock signal and a synchronization detection signal, wherein the pixel clock generator includes:

pixel clock generating means for dividing a frequency of said high-frequency clock signal so as to generate one or more first pulses of a reference period, one or more second pulses of a long period longer than the reference period and one or more third pulses of a short period shorter than the reference period, and said pixel clock generating means outputting, as the pixel clock signal, one of the first, second and third pulses that is designated by output selection data;

first selection means for outputting first selection data selectively designating one of the first, second and third pulses, in synchronization with said pixel clock signal, in accordance with a time-series distribution of the first, second and third pulses of each period defined by a first set of data;

second selection means for outputting second selection data selectively designating one of the first, second and third pulses, in synchronization with said pixel clock signal, in accordance with a time-series distribution of the first second and third pulses of each period defined by a second set of data; and synthesizing means for adding the first selection data and the second selection data so as to generate said output selection data and output said output selection data to said pixel clock generating means.

11. The synchronization signal generator as claimed in claim 10, wherein values of the output selection data designating the reference period, the long period and the short period are equal to numerical values a, b and c, respectively, and said synthesizing means sets the output selection data to the value a when a result of addition is a×2 or b+c, and to the value a when a result of addition is a+b, and said synchronization means sets the output selection data to the value b when a result of addition is b×2, and said synchronization means sets the output selection data to the value c when a result of addition is c×2.

12. The synchronization signal generator as claimed in claim 11, wherein the values a, b and c are set to 0, 1 and 3, respectively.

13. The synchronization signal generator as claimed in claim 10, wherein a plurality of said pixel clock generators are provided each of which shares said single high-frequency clock generating means.

14. A synchronization signal generator comprising:

high-frequency clock generating means for generating a high-frequency clock signal; and a pixel clock generator, wherein the pixel clock generator includes:

pixel clock generating means for dividing a frequency of said high-frequency clock signal so as to generate one or more first pulses of a reference period, one or more second pulses of a long period longer than the reference period and one or more third pulses of a short period shorter than the reference period, and said pixel clock generating means outputting, as a pixel clock signal, one of the first, second and third pulses that is designated by output selection data;

first selection means for outputting first selection data selectively designating one of the first, second and third pulses, in synchronization with said pixel clock signal, in accordance with a time-series distribution of the first, second and third pulses of each period defined by a first set of data;

second selection means for outputting second selection data selectively designating one of the first, second and third pulses, in synchronization with said pixel clock signal, in accordance with a time-series distribution of the first, second and third pulses of each period defined by a second set of data; and synthesizing means for synthesizing the First selection data and the second selection data so as to generate said output selection data, wherein values of the data designating the pluses of the reference period, the long period longer than the reference period and the short period shorter than the reference period are set to numerical values a, b and c, respectively, and wherein said synthesizing means sets the output selection data to the value a when both the first selection data and the second selection data are equal to a, and sets the output selection data to the value b when one of the first selection data and the second selection data is equal to a and the other is equal to b;

said synthesizing means sets the output selection data to the value b when both the first selection data and the second selection data are equal to b, and sets the output selection data to the value a when one of the first selection data and the second selection data is equal to b and the other is equal to c; and said synthesizing means sets the output selection data to the value c when both the first selection data and the second selection data are equal to c.

15. The synchronization signal generator as claimed in claim 14, wherein the values a, b and c are set to 0, 1 and 3, respectively.

16. The synchronization signal generator as claimed in claim 14, wherein a plurality of said pixel clock generators are provided each of which shares said single high-frequency clock generating means.

17. A method of generating a synchronization signal, comprising:

generating a high-frequency clock signal based on a reference clock signal and a synchronization detection signal;

dividing a frequency of said high-frequency clock signal so as to generate one or more first pulses of a reference period, one or more second pulses of a long period longer than the reference period and one or more third pulses of a short period shorter than the reference period, and outputting, as a pixel clock signal one of the first, second and third pulses that is designated by an output selection signal;

generating a first selection signal selectively designating one of the first, second and third pulses, in synchronization with said pixel clock signal, in accordance with a time-series distribution of the first, second and third pulses of each period defined by a first set of data;

generating a second selection signal selectively designating one of the first, second and third pulses, in synchronization with said pixel clock signal in accordance with a time-series distribution of the first, second and third pulses of each period defined by a second set of data;

synthesizing the first selection signal and the second selection signal so as to generate said output selection signal; and generating a synchronization signal in accordance with said pixel clock signal and said synchronization detection signal.

18. A method of generating a synchronization signal, comprising:

generating a high-frequency clock signal based on a reference clock signal and a synchronization detection signal;

dividing a frequency of said high-frequency clock signal so as to generate one or more first pulses of a reference period, one or more second pulses of a long period longer than the reference period and one or more third pulses of a short period shorter than the reference period, and outputting, as a pixel clock signal, one of the first, second and third pulses that is designated by output selection data;

generating first selection data selectively designating one of the first, second and third pulses, in synchronization with said pixel clock signal, in accordance with a time-series distribution of the first, second and third pulses of each period defined by a first set of data;

generating second selection data selectively designating one of the first, second and third pulses, in synchronization with said pixel clock signal, in accordance with a time-series distribution of the first, second and third pulses of each period defined by a second set of data;

summing the first selection signal and the second selection signal so as to generate and output said output selection data; and generating a synchronization signal in accordance with said pixel clock signal and said synchronization detection signal.

19. A method of generating a synchronization signal, comprising:

generating a high-frequency clock signal based on a reference clock signal and a synchronization detection signal;

dividing a frequency of said high-frequency dock signal so as to generate one or more first pulses of a reference period, one or more second pulses of a long period longer than the reference period and one or more third pulses of a short period shorter than the reference period, and outputting, as a pixel clock signal, one of the first, second and third pulses that is designated by output selection data;

generating first selection data selectively designating one of the first, second and third pulses, in synchronization with said pixel clock signal, in accordance with a time-series distribution of the first, second and third pulses of each period defined by a first set of data;

generating second selection data selectively designating one of the first, second and third pulses, in synchronization with said pixel clock signal, in accordance with a time-series distribution of the first, second and third pulses of each period defined by a second set of data;

synthesizing the first selection data and the second selection data so as to generate said output selection data, and generating a synchronization signal in accordance with said pixel clock signal and said synchronization detection signal, wherein values of the data designating the pluses of the reference period, the long period longer than the reference period and the short period shorter than the reference period are set to numerical values a, b and c, respectively, and wherein the step of synthesizing includes:
setting the output selection data to the value a when both the first selection data and the second selection data are equal to a, and sets the output selection data to the value b when one of the first selection data and the second selection data is equal to a and the other is equal to b;
setting the output selection data to the value b when both the first selection data and the second selection data are equal to b, and sets the output selection data to the value a when one of the first selection data and the second selection data is equal to b and the other is equal to c; and
setting the output selection data to the value c when both the first selection data and the second selection data are equal to c.

* * * * *